United States Patent
Alliger

(10) Patent No.: US 9,376,518 B2
(45) Date of Patent: Jun. 28, 2016

(54) RACEMO SELECTIVE METALLATION PROCESS

(71) Applicant: ExxonMobil Chemical Patents Inc., Baytown, TX (US)

(72) Inventor: Glen E. Alliger, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 14/450,494

(22) Filed: Aug. 4, 2014

(65) Prior Publication Data

US 2015/0065668 A1 Mar. 5, 2015

Related U.S. Application Data

(60) Provisional application No. 61/870,989, filed on Aug. 28, 2013.

(51) Int. Cl.

| | |
|---|---|
| *C08F 4/6592* | (2006.01) |
| *C08F 10/00* | (2006.01) |
| *C08F 210/16* | (2006.01) |
| *C08F 110/06* | (2006.01) |
| *C08F 4/659* | (2006.01) |

(52) U.S. Cl.
CPC ............ *C08F 210/16* (2013.01); *C08F 4/65927* (2013.01); *C08F 110/06* (2013.01); *C08F 4/65912* (2013.01); *C08F 4/65916* (2013.01); *C08F 10/00* (2013.01)

(58) Field of Classification Search
CPC ....... C07F 17/00; C08F 4/65927; C08F 10/00
See application file for complete search history.

(56) References Cited

U.S. PATENT DOCUMENTS 5,126,303 A * 6/1992 Resconi ................. C08F 10/00
 502/103
5,892,075 A * 4/1999 Murata ................... C07F 17/00
 502/103

FOREIGN PATENT DOCUMENTS

| | | |
|---|---|---|
| EP | 0 574 597 B1 | 1/1998 |
| EP | 1 671 983 | 6/2006 |
| EP | 2 383 299 | 11/2011 |
| EP | 2 650 300 | 10/2013 |
| JP | 1998-130322 A | 5/1998 |
| JP | 3946248 | 7/2007 |
| JP | 2002-530416 | 11/2008 |
| JP | 2008-285443 | 11/2008 |
| JP | 2012-012306 | 1/2012 |
| KR | 10-0293042 | 11/2001 |
| KR | 2004/099990 | 2/2004 |
| KR | 10-0040893 | 4/2013 |
| WO | 2004/037834 | 5/2004 |
| WO | 2004/05724 | 6/2004 |
| WO | 2006/010139 | 1/2006 |
| WO | 2011/135004 A2 | 11/2011 |
| WO | 2011/135004 A3 | 11/2011 |
| WO | 2011/135005 A2 | 11/2011 |
| WO | 2011/135005 A3 | 11/2011 |
| WO | 2012/084961 A1 | 6/2012 |

OTHER PUBLICATIONS

Damrau, Hans-Robert H. et al., "Racemo-Selective Synthesis of ansa-Zirconocene Derivates from Zirconium Biphenolate Compleses", Organometallics, 2001, vol. 20, pp. 5258-5265.
LoCoco, Matthew D. et al., "Chelate-Controlled Synthesis of Racemic ansa-Ziroconocenes", J. Am. Chem. Soc., 2004, vol. 126, pp. 15231-15244.
Nifant'ev, Ilya E. et al., "Novel Effective Racemoselective Method for the Synthesis of ansa-Zirconocenes and Its Use for the Preparation of C2-Symmetric Complexes Based on 2-Methyl-4-aryltetrahydro(s)indacene as Catalysts for Isotactic Propylene Polymerization and Ethylene-Propylene Copolymerization", Organometallics, 2012, vol. 31, pp. 4340-4348.
Njua, Edmond Y. et al., "Syntheses and Structures of Cationic and Neutral, Homo- and Heteroleptic tert-Butoxides of the Group 4 Metals", Inorganic Chemistry, 2010, vol. 49, pp. 2163-2172.
Wang, Huadong et al., "A 1,8-Naphthylene-Bridged Bis (indenyl) zinc THF Adduct: Formation and Structure of an ansa-Zincocene Derivative", Angewandte Chemie, International Edition, 46 (26), pp. 4905-4908.

* cited by examiner

*Primary Examiner* — Caixia Lu

(57) ABSTRACT

This invention relates to racemic bridged bis(indenyl)metallocene transition metal compounds, rac-directing metallation reagents and a process to produce the racemic bridged bis (indenyl)metallocene transition metal compounds using the rac-directing metallation regents.

17 Claims, No Drawings

RACEMO SELECTIVE METALLATION PROCESS

PRIORITY

This application claims the benefit of and priority to U.S. Ser. No. 61/870,989, filed Aug. 28, 2013.

FIELD OF THE INVENTION

This invention relates to racemic bis(indenyl) metallocene transition metal compounds, preparation and uses thereof.

BACKGROUND OF THE INVENTION

The synthesis of bridged bis(indenyl) metallocenes can be challenging. Deprotonation of the pro-ligand followed by introduction of a metal halide, typically, a group 4 metal tetrachloride, generally forms two isomers of the product, racemic (rac) and meso. The meso form is often found to be undesirable because its polymerization activity relative to the rac isomer can be greatly reduced. Further, rac-dimethylsilyl-bridged bis(indenyl) metallocenes are of significant interest due to their ability to catalyze the formation of isotactic polypropylene. Thus, repeated crystallizations may be required to isolate the pure rac product, leading to lengthy purification processes and diminished yields. Directing metallation reagents are available, but can be difficult or expensive to scale, or can be found to be ineffective. Thus, the need for scalable, effective rac-directing metallation reagents still exists.

Nifant'ev et al. have used tert-butylamide as a directing agent for substituted bis indenyl and indacenyl compounds, however the effect with such was inconsistent, especially for 2-methyl, 4 phenyl substituted indenes, see Nifant'ev, I. E. et al., *Organometallics,* 2012, 31, 4340).

Other references of interest include 1) Damrau, H.-R. H. et al., *Organometalleas,* 2001, 20, 5258; 2) LoCoco, M. D. et al., *J. Am. Chem. Soc.,* 2004, 126, 15231, and 3) Njua, E. Y. et al., *Inorg. Chem.,* 2010, 49, 2163.

SUMMARY OF THE INVENTION

The instant disclosure is directed to racemic bis(indenyl) metallocene transition metal compounds, racemic directing metallation reagents, processes to produce racemic rich catalyst compounds, catalyst systems comprising such compounds, and processes for the polymerization of olefins using such catalyst compounds and systems.

In an embodiment of the invention, a process comprises reacting a deprotonated bis(cyclopentadienyl) compound with a racemic directing (rac-directing) metallation reagent to form a product mixture having an increased concentration of the rac-isomer of a metallocene transition metal compound relative to the amount, if any, of the meso isomer formed. In an embodiment of the invention, a deprotonated bridged bis (indenyl) compound is reacted with a rac-directing metallation reagent to form a product mixture enriched in a racemic isomer of the corresponding bridged bis(indenyl)metallocene transition metal compound relative to any meso isomer formed.

In an embodiment of the invention, a compound comprises greater than 50 mol % of a racemic isomer of a bridged bis(indenyl)metallocene transition metal compound based on the total amount of the compound present.

In an embodiment of the invention, a process comprises contacting one or more olefins with a catalyst system comprising an activator and a racemic bridged bis(indenyl)metallocene transition metal compound at polymerization conditions to produce a polyolefin.

In an embodiment of the invention, a process comprises contacting a deprotonated bridged bis(indenyl) compound with a rac-directing metallation reagent to form a product mixture enriched in a racemic isomer of a bridged bis(indenyl)metallocene transition metal compound relative to any meso isomer formed, contacting the bridged bis(indenyl)metallocene transition metal compound with an activator to form a catalyst system; and contacting one or more olefins with the catalyst system at polymerization conditions to produce a polyolefin.

DETAILED DESCRIPTION

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

In the structures depicted throughout this specification and the claims, a solid line indicates a bond, and each dashed line represents a bond having varying degrees of covalency and a varying degree of coordination.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from groups 13, 14, 15, 16, or 17 of the periodic table of the elements. In addition two or more such hydrocarbyl radicals may together form a fused ring system, including partially or fully hydrogenated fused ring systems, which may include heterocyclic radicals.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which may also be referred to as a methyl functional group, ethyl alcohol is an ethyl group, which is the base structure, substituted with an —OH functional group, and pyridine is a phenyl group having a carbon in the base structure of the benzene ring substituted with a nitrogen atom.

For purposes herein, a hydrocarbyl radical may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosenyl, and triacontenyl.

For purposes herein, hydrocarbyl radicals may also include isomers of saturated, partially unsaturated and aromatic cyclic structures wherein the radical may additionally be subjected to the types of substitutions described above.

For purposes herein, the term "aryl", "aryl radical", and/or "aryl group" refers to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For purposes of this invention, a triflate is represented by the formula:

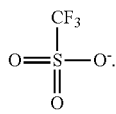

Likewise the terms "functional group," "group" and "substituent" are also used interchangeably throughout this document unless otherwise specified. For purposes herein, a functional group may include both organic and inorganic radicals or moieties comprising elements from groups 13, 14, 15, 16, 17 of the periodic table of elements. Suitable functional groups may include hydrocarbyl radicals, e.g., alkyl radicals, alkene radicals, aryl radicals, and/or halogen (Cl, Br, I, F), O, S, Se, Te, $NR^*_x$, $OR^*$, $SeR^*$, $TeR^*$, $PR^*_x$, $AsR^*_x$, $SbR^*_x$, $SR^*$, $BR^*_x$, $SiR^*_x$, $GeR^*_x$, $SnR^*_x$, $PbR^*_x$, and/or the like, wherein each $R^*$ is independently a hydrogen, a halogen, a $C_1$ to $C_{20}$ hydrocarbyl as defined above and wherein x is the appropriate integer to provide an electron neutral moiety. Other examples of functional groups include those typically referred to as amines, imides, amides, ethers, alcohols (hydroxides), sulfides, sulfates, phosphides, halides, phosphonates, alkoxides, esters, carboxylates, aldehydes, and the like.

For purposes herein "direct bonds," "direct covalent bonds" or "directly bridged" are used interchangeably to refer to covalent bonds directly between atoms that do not have any intervening atoms.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of this disclosure, the term "α-olefin" includes $C_2$-$C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst," "catalyst compound," and "transition metal compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components it is well understood by one of ordinary skill in the art that the ionic form of the component is the form that reacts with the monomers to produce polymers.

For purposes herein the term "catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

An "anionic ligand" is a negatively charged ligand which donates one or more pairs of electrons to a metal ion. A "neutral donor ligand" is a neutrally charged ligand which donates one or more pairs of electrons to a metal ion. A labile ligand is a moiety which is bonded to the metal of a metallocene catalyst precursor, but which is removed upon activation of the catalyst precursor into a catalyst.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment a co-activator can be pre-mixed with the catalyst compound to form an alkylated catalyst compound.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units, e.g., Mw, Mn, Mz, are g/mol.

For the purposes herein, the term "pseudohalogen" is defined to be any compound that is an azide, an isocyanate, a thiocyanate, an isothiocyanate or a cyanide.

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, t-butyl, tert-Bu, or t-Bu refers to tertiary butyl, n-butyl is normal butyl, pMe is para-methyl, Bz is benzyl, THF is tetrahydrofuran, (thf) is a tetrahydrofuranyl radical, Mes is mesityl, also known as 1,3,5-trimethylphenyl, Tol is toluene, tolyl is a toluene radical, TMS is trimethylsilyl, TIBAL is triisobutylaluminum, TNOAL is triisobutyl n-octylaluminum, MAO is methylalumoxane, and MOMO is methoxymethoxy (also referred to as methoxymethyl ether).

For purposes herein whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

For purposes herein, RT is room temperature, which is defined as 25° C. unless otherwise specified. All percentages are weight percent (wt %) unless otherwise specified.

Polypropylene microstructure is determined by $^{13}$C-NMR spectroscopy, including the concentration of isotactic and syndiotactic dyads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in d$_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

For purposes herein, a bulky ligand substitution is defined as a C$_3$ to C$_{20}$ hydrocarbyl radical; —OR$^a$—SR$^a$, —NR$^a_2$ and P(R$^a$)(R$^b$), where each R$^a$ is independently a C$_3$ to C$_{20}$ hydrocarbyl having a molecular volume greater than or equal to an isopropyl substitution or a C$_3$ to C$_{20}$ hydrocarbyl substituted organometalloid having a molecular volume greater than or equal to an isopropyl substitution, and R$^b$ is hydrogen, a halogen, a C$_1$ to C$_{20}$ substituted or unsubstituted hydrocarbyl, or R$^b$ is, independently, as defined for R$^a$. The molecular volume of a substituent is used herein as an approximation of spatial steric bulk. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3Vs, where Vs is the scaled volume. Vs is the sum of the relative volumes of the constituent atoms, and is calculated from the molecular formula of the substituent using the following table of relative volumes. For fused rings, the Vs is decreased by 7.5% per fused ring.

| Element | Relative Volume, Å (Vs) |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For purposes herein, a bulky substituent is defined as any substituent having a molecular volume greater than or equal to an isopropyl substitution (MV=8.3Vs=124.4). Examples of other suitable bulky substituents include t-butyl, benzyl, adamantyl, halo substituted and unsubstituted aryl functional groups, and the like.

For purposes herein, a metallocene compound is an organometallic coordination compound in which one, two or three cyclopentadienyl rings (with or without substituents) are bonded to a central transition metal atom. For purposes herein, indene and fluorine (with or without substituents) are considered cyclopentadienyl rings.

For purposes herein, a "bridged bis(indenyl) compound" is a compound where two indenyl groups (with or without substituents) are bound together via a bridging group (such as those defined as A herein). For purposes herein, a racemic bridged bis(indenyl) catalyst compound (also referred to as a racemic bridged bis(indenyl) transition metal compound or a racemic bridged bis(indenyl) metallocene catalyst precursor) refers to a metallocene transition metal compound represented by the formula:

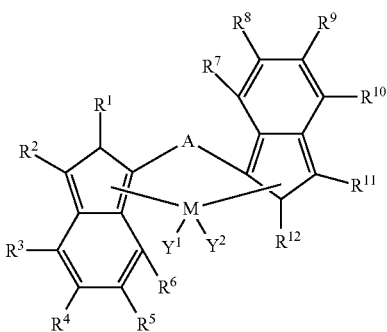

wherein M is a Group 4, 5, or 6 metal of the periodic table of the elements;

wherein A is a bridging group, typically a divalent radical comprising a $C_1$-$C_{20}$ hydrocarbyl radical, a functional group comprising elements from groups 13, 14, 15, 16 or 17 of the periodic table of the elements, or combinations thereof;

wherein each of $Y^1$ and $Y^2$ is, independently, a halogen, a monovalent radical comprising a molecular volume greater than or equal to the molecular volume of an isopropyl substitution, or a combination thereof, the monovalent radical comprising a $C_3$-$C_{20}$ hydrocarbyl radical, a functional group comprising elements from groups 13, 14, 15, 16 or 17 of the periodic table of the elements, or a combination thereof (preferably each of $Y^1$ and $Y^2$ is, independently, —$OR^a$—$SR^a$, —$NR^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen, a $C_1$ to $C_{20}$ substituted or unsubstituted hydrocarbyl, or $R^b$ is, independently, as defined for $R^a$); and wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising elements from groups 13, 14, 15, 16 or 17 of the periodic table of the elements, or combinations thereof.

In an embodiment of the invention, metallation of a deprotonated bridged bis(cyclopentadiene) compound includes contacting the deprotonated compound with a metallation reagent to produce the metallocene transition metal compound which may then be contacted with an activator and thus, activated to produce a metallocene catalyst. In an alternative embodiment of the invention, a metallocene transition metal compound may be reacted with a labile group replacement reagent to replace the labile groups of the compound with more readily substituted or removed labile groups prior to activation.

In an embodiment of the invention, metallation of a deprotonated bridged bis(cyclopentadiene) compound (A) has the ability to produce two isomers of the corresponding metallocene; a racemic pair (B), referred to herein as the "rac" isomer, and a meso isomer (C) as follows:

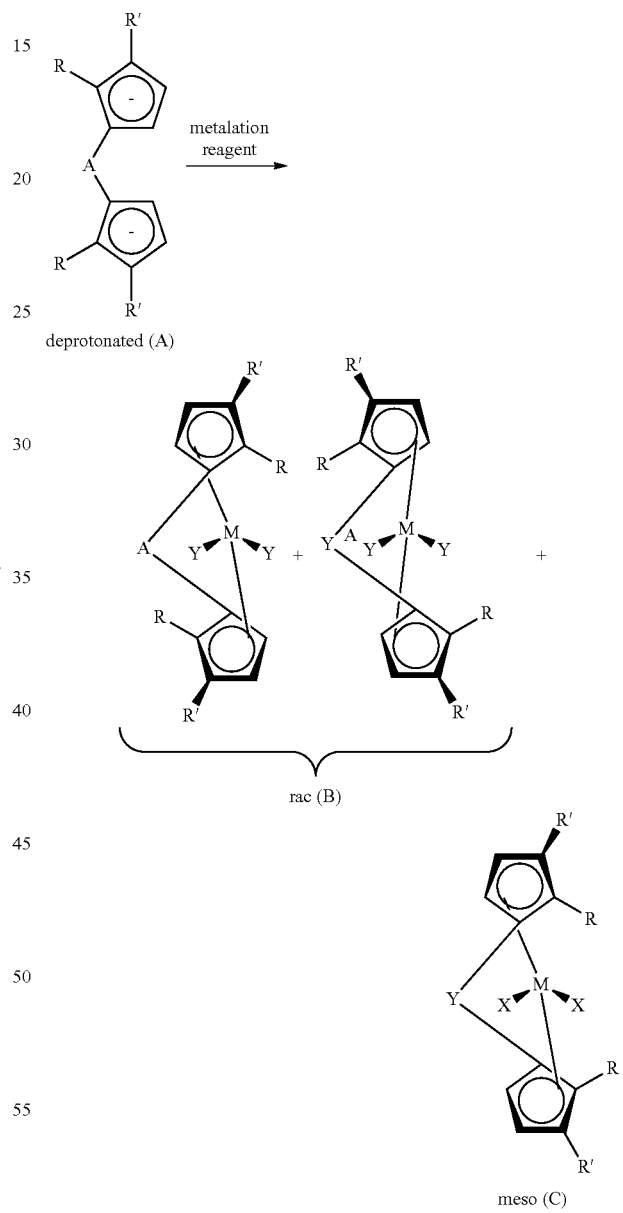

where A and M are as defined above, R and R' are as defined for $R^1$ above, Y and X are as defined for $Y^1$ above.

The racemic mixture B may be the more catalytically active species, and the desired result where an active catalyst is sought. In an embodiment according to the instant disclosure, a rac-directing metallation reagent forms a product mixture having an increased concentration of the racemic mixture, referred to herein as a "rac-rich" or a racemic enriched product mixture, relative to any meso isomer, if any, formed. For purposes herein, a racemic enriched product mixture, compound, or product comprises at least 51 mol % of the racemic isomer based on the total amount of the racemic isomer and the meso isomer present. In an embodiment of the invention, the rac-directing metallation reagent produces a racemic enriched product mixture, product or compound, and in a further embodiment, without subsequent purification being required to remove any meso isomer formed.

Process to Form Catalyst Compounds

In an embodiment of the invention, a process comprises: contacting a deprotonated bridged bis(indenyl) compound with a rac-directing metallation reagent to form a product mixture enriched in a racemic isomer of a bridged bis(indenyl)metallocene transition metal compound relative to any meso isomer formed;

wherein the rac-directing metallation reagent is represented by the formula:

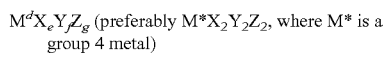

$M^d X_e Y_f Z_g$ (preferably $M^* X_2 Y_2 Z_2$, where $M^*$ is a group 4 metal)

where M, X, and Z are as defined below and each Y is, independently, $-O-R^a$, $-SR^a$, $-NR^a{}_2$ and $-P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen, a $C_1$ to $C_{20}$ substituted or unsubstituted hydrocarbyl, or $R^b$ is, independently, as defined for $R^a$, d is the coordination number of the metal, M, and is 4, 5 or 6,
e is 2, 3, 4 or 5, f is 1, 2, 3 or 4 and g is 0, 1 or 2, where e+f=d;
wherein the bridged bis(indenyl)metallocene transition metal compound is represented by the formula:

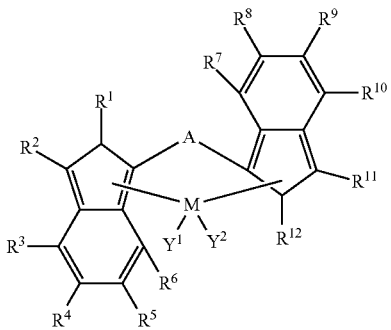

wherein M is a Group 4, 5, or 6 metal of the periodic table of the elements, preferably group 4, preferably Hf, Ti or Zr;
wherein A is a bridging group, preferably a divalent radical comprising a $C_1$-$C_{20}$ hydrocarbyl radical, a functional group comprising elements from Groups 13, 14, 15, 16 or 17 of the periodic table of the elements, or a combination thereof;
wherein each X is a halogen (preferably Cl, Br, F or I), a triflate or a pseudohalogen;
wherein each of $Y^1$ and $Y^2$ is independently, $-OR^a$, $-SR^a$, $-N(R^a)_2$, or $-P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen, a $C_1$ to $C_{20}$ substituted or unsubstituted hydrocarbyl, or $R^b$ is, independently, as defined for $R^a$;
wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising an element from Groups 13, 14, 15, 16, or 17 of the periodic table of the elements, or a combination thereof (preferably H, Cl, Br, methyl, ethyl, propyl, butyl, pentyl, hexyl, heptyl, octyl, nonyl, decyl, undecyl, docecyl, phenyl, benzyl and isomers and substituted variations thereof); and
wherein each Z is, independently, a leaving group, comprising a monovalent $C_2$-$C_{20}$ hydrocarbyl radical, a monovalent functional group comprising an element from Groups 13, 14, 15, 16 or 17 of the periodic table of the elements, or a combination thereof.

In an embodiment, each of $Y^1$ and $Y^2$ are independently monovalent and as such, $Y^1$ and $Y^2$ are not bound to each other to produce a single divalent radical. In an embodiment, each of $R^a$ and $R^b$ are independently monovalent and as such, $R^a$ and $R^b$ are not bound to each other to produce a single divalent radical. In an embodiment, where two $R^a$ are present, each of the $R^a$ groups are independently monovalent and as such are not bound to each other to produce a single divalent radical.

In an embodiment of the invention, the racemic enriched product mixture formed comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer, if any, formed. Preferably, the racemic enriched product mixture formed comprises greater than 90 mol % of the racemic isomer, or greater than 95 mol % of the racemic isomer, or greater than 99 mol % of the racemic isomer, based on the total amount of the racemic and meso isomer, if any, formed. In a particular embodiment of the invention, the racemic enriched product mixture formed comprises greater than 90 mol % of the racemic isomer, or greater than 95 mol %, or greater than 99 mol % of the racemic isomer, based on the total amount of the racemic and meso isomer, if any, formed without subsequent purification to remove meso isomer present in the product mixture. In a particular embodiment of the invention, the bridged bis(indenyl)metallocene transition metal compound formed consists essentially of the racemic isomer.

Amounts of rac and meso isomers are determined by proton NMR. $^1$H NMR data are collected at 120° C. in a 5 mm probe using a 400 MHz Bruker spectrometer with deuterated chloroform. Data is recorded using a maximum pulse width of 45°, 8 seconds between pulses and signal averaging 16 transients. The spectrum is normalized to protonated chloroform in the deuterated chloroform, which is expected to show a peak at 7.27 ppm.

In an embodiment of the invention, A is dimethylsilyl. In a particular embodiment of the invention, A is dimethylsilyl, X is Cl, each Y is —O-iPr or —O-tBu, and Z comprises a tetrahydrofuranyl radical.

In any embodiment of any formula described herein, A is represented by the formula $R_2 c_J$, where J is C, Si, or Ge, and each $R^c$ is, independently, hydrogen, halogen, $C_1$ to $C_{20}$ hydrocarbyl or a $C_1$ to $C_{20}$ substituted hydrocarbyl, and two $R^c$ can form a cyclic structure including aromatic, partially saturated, or saturated cyclic or fused ring system. In a preferred embodiment of the invention in any formula described herein, A is represented by the formula, $(R^*_2G)_g$, where each G is C, Si, or Ge, g is 1 or 2, and each $R^*$ is, independently, hydrogen, halogen, $C_1$ to $C_{20}$ hydrocarbyl or a $C_1$ to $C_{20}$ substituted hydrocarbyl, and two or more $R^*$ can form a cyclic structure including aromatic, partially saturated, or saturated cyclic or fused ring system. Preferably A is $CH_2$, $CH_2CH_2$, $C(CH_3)_2$, $SiMe_2$, $SiPh_2$, $Si(Me_3SiPh)_2$, $SiMePh$, $Si(CH_2)_3$, $Si(CH_2)_4$, or $Si(CH_2)_5$.

In any embodiment of any formula described herein, $Y^1$ and $Y^2$ are, independently, —O-iPr, —O-t-Bu, —O-iBu, —O-n-Bu, —O-secBu, —O-(2-methyl-butene), —O-(3-methyl-butene), —O-isopentyl, —O-n-pentyl, —O-n-hexyl, —O-isohexyl, —O-methylpentene, —O-dimethylbutene, —O-cyclopentyl, —O-cyclohexyl, —O-octyl, N-iPr$_2$, —N-t-Bu$_2$, —N-iBu$_2$, —N-n-Bu$_2$, —N-secBu$_2$, —N-(2-methyl-butene)$_2$, —N-(3-methyl-butene)$_2$, —N-isopentyl$_2$, —N-n-pentyl$_2$, —N-n-hexyl$_2$, —N-isohexyl$_2$, —N-methylpentene$_2$, —N-dimethylbutene$_2$, —N-cyclopentyl$_2$, —N-cyclohexyl$_2$, —N-octyl$_2$. S-t-Bu, —S-iBu, —S-n-Bu, —S-secBu, —S-(2-methyl-butene), —S-(3-methyl-butene), —S-isopentyl, —S-n-pentyl, —S-n-hexyl, —S-isohexyl, —S-methylpentene, —S-dimethylbutene, —S-cyclopentyl, —S-cyclohexyl, —S-octyl. Alternately one or both $Y^1$ and $Y^2$ may, independently, be $M^4$-trialkylsilyl, $M^5$-(trialkylsilyl)$_2$, $M^4$-triphenylsilyl, or $M^5$-(triphenylsilyl)$_2$, where each alkyl is, independently, methyl, ethyl, propyl, butyl, etc, preferably trimethylsilyl), $M^4$ is O or S, $M^5$ is N or P; and each phenyl is, independently, a substituted or unsubstituted phenyl, (preferably triphenylsilyl, tri(trimethylphenyl)silyl).

In a preferred embodiment of the invention, each $Y^1$ and $Y^2$ independently is —O-iPr, —O-tBu, or —O—SiMe$_3$.

In any embodiment of any formula described herein, d is 4, 5 or 6, preferably 4. In any embodiment of any formula described herein, e is 2, 3, 4 or 5, preferably 2 or 3, preferably 2; and f is 1, 2 or 3, preferably 2 and g is 0, 1 or 2, preferably 1 or 2, preferably 2.

In a particular embodiment of the invention, the bridged bis(indenyl) compound is represented by the formula:

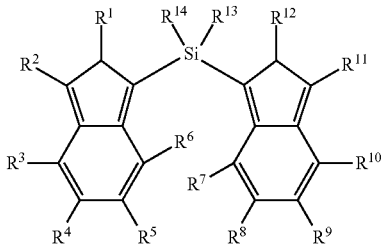

wherein each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently, a hydrogen, a halogen, a $C_1$-$C_{20}$ hydrocarbyl radical, a functional group comprising elements from groups 13, 14, 15, 16 or 17 of the periodic table of the elements, or a combination thereof.

In an embodiment of the invention, $R^{13}$ and $R^{14}$ are independently a $C_1$-$C_{10}$ hydrocarbyl radical. In a particular embodiment of the invention, $R^{13}$ and $R^{14}$ are independently methyl or ethyl.

In an embodiment of the invention, $R^3$ and $R^{10}$ each comprise a phenyl group or a substituted phenyl group (preferably the substituted phenyl is substituted with 1, 2, 3, 4 or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl or an isomer thereof, preferably the phenyl is substituted at the meta or para positions, preferably the 3 and/or 5 positions, preferably with a $C_4$ to $C_{12}$ alkyl group. Alternately the phenyl may be substituted at the 2 position, but is preferably not substituted in the 2 and 6 positions, e.g., in a preferred embodiment if the invention when the 2 position of the phenyl is substituted, the 6 position is H).

In an embodiment of the invention, $R^1$ and $R^{12}$ each comprise a $C_1$-$C_{10}$ hydrocarbyl radical (preferably methyl, ethyl, propyl, butyl, pentyl, hexyl, heptyl, octyl, nonyl, or decyl).

In a particular embodiment of the invention, $R^1$ and $R^{12}$ each comprise a $C_1$-$C_{10}$ hydrocarbyl radical (preferably methyl, ethyl, propyl, butyl, pentyl, hexyl, heptyl, octyl, nonyl, or decyl) and $R^3$ and $R^{10}$ each comprise a phenyl group or a substituted phenyl group (preferably the substituted phenyl is substituted with 1, 2, 3, 4 or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl or an isomer thereof, preferably the phenyl is substituted at the meta or para positions, preferably the 3 and/or 5 positions, preferably with a $C_4$ to $C_{12}$ alkyl group). Alternately the phenyl may be substituted at the 2 position, but is preferably not substituted in the 2 and 6 positions, e.g. in a preferred embodiment if the invention when the 2 position of the phenyl is substituted, the 6 position is H.

In a particular embodiment of the invention, the bridged bis(indenyl) compound is a bridged bis(4-(phenyl or substituted phenyl)-2-alkylindene), where the alkyl may be a $C_1$ to $C_{30}$ alkyl group, such as methyl, ethyl, propyl, butyl, pentyl, hexyl, heptyl, octyl, nonyl, decyl, undecyl, dodecyl or an isomer thereof; and the substituted phenyl is substituted with 1, 2, 3, 4 or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl or an isomer thereof, preferably the phenyl is substituted at the meta or para positions, preferably the 3 and/or 5 positions. Alternately the phenyl may be substituted at the 2 position, but is preferably not substituted in the 2 and 6 positions, e.g. in a preferred embodiment if the invention when the 2 position of the phenyl is substituted, the 6 position is H.

In a particular embodiment of the invention, the bridged bis(indenyl) compound is one or more of dimethylsilyl bis(4-(o-tolyl)-2-methylindene), dimethylsilyl bis(4-phenyl-2-methylindene), dimethylsilyl bis(4-(3',5'-di-t-butylphenyl)-2-methylindene).

In an embodiment, the rac-directing metallation reagent is represented by the formula:

$$M^dX_eY_fZ_g, \text{ preferably } M^*X_2Y_2Z_2$$

wherein M is a Group 4, 5, or 6 metal of the periodic table of the elements;
$M^*$ is a group 4 metal, preferably Zr, Ti or Hf;
d is the coordination number of the metal, M, and is 4, 5 or 6, e is 2, 3, 4 or 5, f is 1, 2, 3 or 4 and g is 0, 1 or 2, where e+f=d;
each X is a halogen (preferably Cl, Br, F or I), a triflate or a pseudohalogen;
each Y is, independently, —$OR^a$—$SR^a$, —$N^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen, a $C_1$ to $C_{20}$ substituted or unsubstituted hydrocarbyl, or $R^b$ is, independently, as defined for $R^a$; and
each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof.

In an embodiment of the invention, M is Ti, Zr, or Hf. In an embodiment, each X is Cl or Br. In a particular embodiment of the invention, each Y is independently -O-iPr or -O-tBu. In a particularly preferred embodiment, M is Ti, Zr, or Hf, each X is Cl or Br, and each Y is independently OR$^a$, where R$^a$ is a monovalent $C_3$ to $C_{20}$ hydrocarbyl radical comprising a molecular volume greater than or equal to the molecular volume of an isopropyl substitution.

In any embodiment of any formula described herein, each Y is, independently, —O-iPr, —O-t-Bu, —O-iBu, —O-n-Bu, —O-secBu, —O-(2-methyl-butene), —O-(3-methyl-butene), —O-isopentyl, —O-n-pentyl, —O-n-hexyl, —O-isohexyl, —O-methylpentene, —O-dimethylbutene, —O-cyclopentyl, —O-cyclohexyl, —O-octyl, N-iPr$_2$, —N-t-Bu$_2$, —N-iBu$_2$, —N-n-Bu$_2$, —N-secBu$_2$, —N-(2-methyl-butene)$_2$, —N-(3-methyl-butene)$_2$, —N-isopentyl$_2$, —N-n-pentyl$_2$, —N-n-hexyl$_2$, —N-isohexyl$_2$, —N-methylpentene$_2$, —N-dimethylbutene$_2$, —N-cyclopentyl$_2$, —N-cyclohexyl$_2$, —N-octyl$_2$, S-t-Bu, —S-iBu, —S-n-Bu, —S-secBu, —S-(2-methyl-butene), —S-(3-methyl-butene), —S-isopentyl, —S-n-pentyl, —S-n-hexyl, —S-isohexyl, —S-methylpentene, —S-dimethylbutene, —S-cyclopentyl, —S-cyclohexyl, —S-octyl. Alternately one or more, preferably both, Y groups may, independently, be M$^4$-trialkylsilyl, M$^5$-(trialkylsilyl)$_2$, M$^4$-triphenylsilyl, or M$^5$-(triphenylsilyl)$_2$, where each alkyl is, independently, methyl, ethyl, propyl, butyl, etc, (preferably trimethylsilyl), M$^4$ is O or S, M$^5$ is N or P; and each phenyl is, independently, a substituted or unsubstituted phenyl, (preferably triphenylsilyl, tri(trimethylphenyl)silyl).

In any embodiment of any formula described herein, Y is —O-iPr, —O-tBu, or —OSiMe$_3$.

In any embodiment of any formula described herein, R$^a$ may be —O-iPr, —O-t-Bu, —O-iBu, —O-n-Bu, —O-secBu, —O-(2-methyl-butene), —O-(3-methyl-butene), —O-isopentyl, —O-n-pentyl, —O-n-hexyl, —O-isohexyl, —O-methylpentene, —O-dimethylbutene, —O-cyclopentyl, —O-cyclohexyl, —O-octyl, N-iPr, —N-t-Bu, —N-iBu, —N-n-Bu, —N-secBu, —N-(2-methyl-butene), —N-(3-methyl-butene), —N-isopentyl, —N-n-pentyl, —N-n-hexyl, —N-isohexyl, -N-methylpentene, —N-dimethylbutene, —N-cyclopentyl, —N-cyclohexyl, —N-octyl, S-t-Bu, —S-iBu, —S-n-Bu, —S-secBu, —S-(2-methyl-butene), —S-(3-methyl-butene), —S-isopentyl, —S-n-pentyl, —S-n-hexyl, —S-isohexyl, —S-methylpentene, —S-dimethylbutene, —S-cyclopentyl, —S-cyclohexyl, -S-octyl, trialkylsilyl, (where each alkyl is, independently, methyl, ethyl, propyl, butyl, etc., preferably trimethylsilyl), trialkylphenyl (where each phenyl is, independently, a substituted or unsubstituted phenyl, (preferably triphenylsilyl, tri(trimethylphenyl)silyl), dialkylborane or trialkylborane (where each alkyl is, independently, methyl, ethyl, propyl, butyl, etc.), dialkylgermanium, trialkyl germanium, tetraalkyl germanium, (where each alkyl is, independently, methyl, ethyl, propyl, butyl, etc., or the alkyl is replaced by a halogen).

In any embodiment of any formula described herein, R$^b$ may be H, Cl, Br, or a $C_1$ to $C_{20}$ hydrocarbyl, such as methyl, ethyl, propyl, butyl, pentyl, hexyl, heptyl, octyl, nonyl, decyl, undecyl, dodecyl or an isomer thereof or any of the specific embodiments listed for R$^a$ above.

In any embodiment of any formula described herein, each Z is, independently, a leaving group comprising a monovalent $C_2$-$C_{20}$ hydrocarbyl radical, a monovalent functional group comprising an element from Groups 13, 14, 15, 16 or 17 of the periodic table of the elements, or a combination thereof. In any embodiment of any formula described herein, each Z is a monovalent $C_2$-$C_{20}$ cyclic hydrocarbyl, saturated or unsaturated, comprising an element from Group 15 or 16 of the periodic table of the elements.

In any embodiment of any formula described herein, Z comprises an oxirenyl radical, an azirinyl radical, a thiirenyl radical, a diazirinyl radical, an oxaziridinyl radical, a dioxiranyl radical, an azetidinyl radical, an azetyl radical, an oxetanyl radical, an oxetyl radical, a thietanyl radical, a thietyl radical, a diazetidinyl radical, a dioxetanyl radical, a dioxetyl radical, a dithietanyl radical, a dithietyl radical, a pyrrolidinyl radical, a pyrrolyl radical, a tetrahydrofuranyl radical, a furanyl radical, a thiolanyl radical, a thiophenyl radical, an imidazolidinyl radical, a pyrazolidinyl radical, an imidazolyl radical, a pyrazolyl radical, an oxazolidinyl radical, an isoxazolidinyl radical, an oxazolyl radical, an isoxazolyl radical, a thiazolidinyl radical, an isothiazolidinyl radical, a thiazolyl radical, an isothiazolyl radical, a dioxolanyl radical, a dithiolanyl radical, a triazolyl radical, a furazanyl radical, an oxadiazolyl radical, a thiadiazolyl radical, a dithiazolyl radical, a tetrazolyl radical, a piperidinyl radical, a pyridinyl radical, an oxanyl radical, a pyranyl radical, a thianyl radical, a thiopyranyl radical, a piperazinyl radical, a diazinyl radical, a morpholinyl radical, an oxazinyl radical, a thiomorpholinyl radical, a thiazinyl radical, a dioxanyl radical, a dioxinyl radical, a dithianyl radical, a dithiinyl radical, a triazinyl radical, a trioxanyl radical, a tetrazinyl radical, an azepanyl radical, an azepinyl radical, an oxepanyl radical, an oxepinyl radical, a thiepanyl radical, a thiepinyl radical, a homopiperazinyl radical, a diazepinyl radical, a thiazepinyl radical, an azocanyl radical, an azocinyl radical, or a combination thereof.

In a particular embodiment of the invention, Z comprises a tetrahydrofuranyl radical. In a particular embodiment of the invention, X is Cl, Y is —O-iPr or —O-tBu, and Z comprises a tetrahydrofuranyl radical. In a particular embodiment of the invention, the rac-directing metallation reagent is MCl$_2$(O—R$^a$)$_2$(thf)$_2$ or MBl$_2$(O—R$^a$)$_2$(thf)$_2$, wherein M is Zr or Hf and R$^a$ is a monovalent $C_3$ to $C_{20}$ hydrocarbyl radical comprising a molecular volume greater than or equal to the molecular volume of an isopropyl substitution. In a particular embodiment of the invention, the rac-directing metallation reagent is ZrCl$_2$(O-tBu)$_2$(thf)$_2$, HfCl$_2$(O-tBu)$_2$(thf)$_2$, ZrCl$_2$(O—SiMe$_3$)$_2$(thf)$_2$, HfCl$_2$(O—SiMe$_3$)$_2$(thf), ZrCl$_2$(O-iPr)$_2$(thf)$_2$, HfCl$_2$(O-iPr)$_2$(thf).

In an embodiment of the invention, a compound comprises greater than 50 mol % of a racemic isomer of a bridged bis(indenyl)metallocene transition metal compound, based on the total amount of the compound present, the compound represented by the formula:

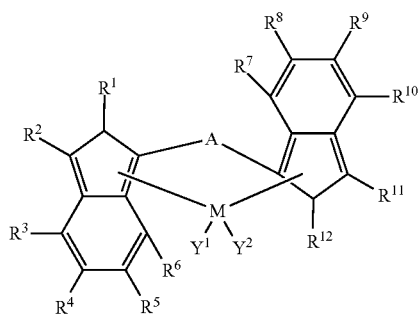

wherein M is a Group 4, 5, or 6 metal of the periodic table of the elements;

wherein A is a divalent radical comprising a $C_1$-$C_{20}$ hydrocarbyl radical, a functional group comprising elements from groups 13, 14, 15, 16 or 17 of the periodic table of the elements, or combinations thereof;

wherein each of $Y^1$ and $Y^2$ is independently, —$OR_a$, —$SR^a$, —$N(R^a)_2$, or —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen, a $C_1$ to $C_{20}$ substituted or unsubstituted hydrocarbyl, or $R^b$ is, independently, as defined for $R^a$; and wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising elements from groups 13, 14, 15, 16, or 17 of the periodic table of the elements, or combinations thereof.

In an embodiment of the invention, the compound comprises greater than 90 mol % of the racemic isomer, based on the total amount of the compound present.

In a particular embodiment of the invention, M is Zr, A is a dimethyl silyl, and $R^1$ and $R^{12}$ are methyl.

In an embodiment of the invention, the racemic bridged bis(indenyl)metallocene transition metal compound is bridgedbis[4-(o-tolyl)-2-methylindenyl]Zr(Ot-Bu)$_2$ comprising greater than 90 mol % racemic isomer, bridgedbis[4-(phenyl)-2-methylindenyl]Zr(Ot-Bu)$_2$ comprising greater than 90 mol % racemic isomer, or bridgedbis[4-(3',5'-dimethyl-phenyl)-2-methylindenyl]Zr(Ot-Bu)$_2$ comprising greater than 90 mol % racemic isomer, preferably the racemic bridged bis(indenyl)metallocene transition metal compound is dimethylsilylbis[4-(o-tolyl)-2-methylindenyl]Zr(Ot-Bu)$_2$ comprising greater than 90 mol % racemic isomer, bridgedbis [4-(phenyl)-2-methylindenyl]Zr(Ot-Bu)$_2$ comprising greater than 90 mol % racemic isomer, or bridgedbis[4-(3',5'-dimethyl-phenyl)-2-methylindenyl]Zr(Ot-Bu)$_2$ comprising greater than 90 mol % racemic isomer.

In a particular embodiment of the invention, the bridged bis(indenyl) compound is a bridged bis(4-(phenyl or substituted phenyl)-2-alkylindene), where the alkyl may be a $C_1$ to $C_{30}$ alkyl group, such as methyl, ethyl, propyl, butyl, pentyl, hexyl, heptyl, octyl, nonyl, decyl, undecyl, dodecyl or an isomer thereof; and the substituted phenyl is substituted with 1, 2, 3, 4, or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl or an isomer thereof, preferably the phenyl is substituted at the meta or para positions, preferably the 3 and/or 5 positions, preferably with a $C_4$ to $C_{12}$ alkyl group. Alternately, the phenyl may be substituted at the 2 position, but is preferably not substituted in the 2 and 6 positions, e.g., in a preferred embodiment if the invention when the 2 position of the phenyl is substituted, the 6 position is H.

In a particular embodiment of the invention, the bridged bis(indenyl) transition metal compound is a bridged bis(4-(phenyl or substituted phenyl)-2-alkylindene)MY$_2$, where M is Hf, Zr or Ti, Y is as defined above, the alkyl may be a $C_1$ to $C_{30}$ alkyl group, such as methyl, ethyl, propyl, butyl, pentyl, hexyl, heptyl, octyl, nonyl, decyl, undecyl, dodecyl or an isomer thereof; and the substituted phenyl is substituted with 1, 2, 3, 4 or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl or an isomer thereof, preferably the phenyl is substituted at the meta or para positions, preferably the 3 and/or 5 positions. Alternately the phenyl may be substituted at the 2 position, but is preferably not substituted in the 2 and 6 positions, e.g., in a preferred embodiment if the invention when the 2 position of the phenyl is substituted, the 6 position is H.

In an embodiment, a catalyst precursor comprises the reaction product of a bridged bis(indenyl) compound according to any embodiment disclosed herein, reacted with a with a rac-directing metallation reagent represented by the formula $M^dX_eY_fZ_g$ (preferably $M^*X_2Y_2Z_2$, where $M^*$ is a group 4 metal, both as defined above) according to any one or more embodiments disclosed herein. In a particular embodiment, the reaction product comprises greater than 90 mol % of the racemic isomer of the catalyst precursor, based on the total amount of the catalyst precursor present.

In an embodiment of the invention, the process of preparing the catalyst compound may optionally comprise contacting the bridged bis(indenyl)metallocene transition metal compound with a labile group replacement reagent to replace labile groups (such as $Y^1$ and $Y^2$ in the formulae above) with a labile group less tightly bound and thus more facile as compared to iso-propoxy, t-butoxy, or the like. In an embodiment, the bridged bis(indenyl)metallocene transition metal compound may be contacted or reacted with a labile group replacement reagent to replace $Y^1$ and $Y^2$ in the formulae above with a labile group selected from the group consisting of halogen, benzyl, phenyl, or a combination thereof. In a particular embodiment of the invention, the labile group replacement reagent is a halo-trialkyl silane, e.g., chlorotrimethylsilane; a mineral acid, e.g., HCl, HBr, or HI; and/or a halogenating compound e.g., SOCl$_2$, and/or a combination thereof.

Typically one racemic bridged bis(indenyl) transition metal compound is used in a polymerization herein, however when desired two or more racemic bridged bis(indenyl) transition metal compound catalysts may be used. In an embodiment, two or more different catalyst compounds, preferably two or more racemic bridged bis(indenyl) transition metal compounds, are present in the catalyst system used herein. In an embodiment, two or more different catalyst compounds are present in the reaction zone where the process(es) described herein occur. When two transition metal compound based catalysts are used in one reactor as a mixed catalyst system, the two transition metal compounds are chosen such that the two are compatible. Compatible catalysts are those catalysts having similar kinetics of termination and insertion of monomer and comonomer(s) and/or do not detrimentally interact with each other. For purposes herein, the term "incompatible catalysts" refers to and means catalysts that satisfy one or more of the following:

1) those catalysts that when present together reduce the activity of at least one of the catalysts by greater than 50%;

2) those catalysts that under the same reactive conditions produce polymers such that one of the polymers has a molecular weight that is more than twice the molecular weight of the other polymer; and 3) those catalysts that differ in comonomer incorporation or reactivity ratio under the same conditions by more than about 30%. A simple screening method such as by $^1$H or $^{13}$C NMR, known to those of ordinary skill in the art, can be used to determine which transition metal compounds are compatible. In an embodiment, the catalyst systems use the same activator for the catalyst compounds. In an embodiment, two or more different activators, such as a non-coordinating anion activator and an alumoxane, can be used in combination. If one or more catalyst compounds contain an $X^1$ or $X^2$ ligand which is not a hydride, or a hydrocarbyl, then in an embodiment the alumoxane is contacted with the catalyst compounds prior to addition of the non-coordinating anion activator.

In an embodiment, when two transition metal compounds are utilized, they may be used in any ratio. In an embodiment, a molar ratio of a first transition metal compound (A) to a second transition metal compound (B) will fall within the range of (A:B) 1:1000 to 1000:1, or 1:100 to 500:1, or 1:10 to 200:1, or 1:1 to 100:1, or 1:1 to 75:1, or 5:1 to 50:1. The particular ratio chosen will depend on the exact pre-catalysts chosen, the method of activation, and the end product desired. In an embodiment, when using two pre-catalysts, where both are activated with the same activator, useful mole percents, based upon the total moles of the pre-catalysts, are 10:90 to 0.1:99, or 25:75 to 99:1, or 50:50 to 99.5:0.5, or 50:50 to 99:1, or 75:25 to 99:1, or 90:10 to 99:1.

Activators

The terms "cocatalyst" and "activator" are used interchangeably to describe activators and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Activators may include alumoxane compounds, modified alumoxane compounds, and ionizing anion recursor compounds that abstract a reactive, σ-bound, metal ligand, referred to herein as a labile ligand, making the metal complex cationic and providing a charge-balancing noncoordinating or weakly coordinating anion.

In an embodiment, a process according to any one or combination of embodiments disclosed herein further includes contacting the bridged bis(indenyl)metallocene catalyst precursor with an activator to form a catalyst system. In an embodiment, the activator comprises alumoxane, a non-coordinating anion activator, or a combination thereof.

In an embodiment of the invention, the process may further comprise contacting the bridged bis(indenyl)metallocene catalyst precursor with a labile group replacement reagent to replace labile groups $Y^1$ and $Y^2$ with a labile group less tightly bound and thus more readily substituted or removed as compared to iso-propoxy, t-butoxy, or the like. The modified bridged bis(indenyl)metallocene catalyst precursor may then be contacted with an activation agent to form a catalyst or a catalyst system. Accordingly, the modification of the labile groups Y may allow for various types of activators to be used. In an embodiment, the bridged bis(indenyl)metallocene catalyst precursor may be further reacted with a labile group replacement reagent to replace $Y^1$ and $Y^2$ with a labile group selected from the group consisting of halogen, benzyl, phenyl, or a combination thereof. In a particular embodiment of the invention, the labile group replacement reagent is a halotrialkyl silane, e.g., chlorotrimethylsilane; a mineral acid, e.g., HCl, HBr, or HI; and/or a halogenating compound e.g., $SOCl_2$, and/or a combination thereof.

In an embodiment of the invention, the activator comprises alumoxane, a non-coordinating anion activator, or a combination thereof. In a preferred embodiment, an alumoxane is combined with the metallocene compound before or in combination with a non-coordinating anion activator. In a preferred embodiment of the invention, an alumoxane is contacted with the metallocene compound, preferably such that at least one leaving group (e.g., -O-t-Bu) is removed, and thereafter a non-coordinating anion activator is combined with the metallocene compound.

In an embodiment of the invention, the activator comprises alumoxane and the alumoxane is present at a ratio of 1 mole aluminum or more to mole of catalyst.

Alumoxanes are generally oligomeric compounds containing —Al($R^1$)—O— sub-units, where $R^1$ is an alkyl radical. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the catalyst precursor compound comprises an abstractable ligand which is an alkyl, halide, alkoxide or amide. Mixtures of different alumoxanes and modified alumoxanes may also be used. In an embodiment, visually clear methylalumoxane may be used. A cloudy or gelled alumoxane can be filtered to produce a clear solution or clear alumoxane can be decanted from the cloudy solution. A useful alumoxane is a modified methyl alumoxane (MMAO) described in U.S. Pat. No. 5,041,584 and/or commercially available from Akzo Chemicals, Inc. under the trade designation Modified Methylalumoxane type 3A.

When the activator is an alumoxane (modified or unmodified), in an embodiment, the maximum amount of activator is a 5000-fold molar excess Al/M over the catalyst compound (per metal catalytic site). In an embodiment, the minimum activator-to-catalyst-compound, which is determined according to molar concentration of the transition metal M, in an embodiment is 1 mole aluminum or less to mole of transition metal M. In an embodiment, the activator comprises alumoxane and the alumoxane is present at a ratio of 1 mole aluminum or more to mole of catalyst compound. In an embodiment, the minimum activator-to-catalyst-compound molar ratio is a 1:1 molar ratio. Other embodiments of Al:M ranges include from 1:1 to 1000:1, or from 1:1 to 500:1, or from 1:1 to 200:1, or from 1:1 to 100:1, or from 1:1 to 50:1.

The term "non-coordinating anion" (NCA) refers to an anion which either does not coordinate to a cation, or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible with the polymerization or catalyst system, stabilize the transition metal cation in the sense of balancing its ionic charge at +1, and yet are sufficiently labile to permit displacement during polymerization.

In an embodiment, an ionizing or stoichiometric activator may be used, which may be neutral or ionic, such as tri (n-butyl) ammonium boron metalloid precursor, polyhalogenated heteroborane anions (WO 98/43983), boric acid (U.S. Pat. No. 5,942,459), or a combination thereof. In an embodiment, neutral or ionic activators alone or in combination with alumoxane or modified alumoxane activators may be used.

Examples of neutral stoichiometric activators include trisubstituted boron, tellurium, aluminum, gallium, and indium, or mixtures thereof. The three substituent groups or radicals can be the same or different and in an embodiment are each independently selected from substituted or unsubstituted alkyls, alkenyls, alkyns, aryls, alkoxy, and halogens. In an embodiment, the three groups are independently selected from halogen, mono or multicyclic (including halosubstituted) aryls, alkyls, and alkenyl compounds, and mixtures thereof; or independently selected from alkenyl radicals having 1 to 20 carbon atoms, alkyl radicals having 1 to 20 carbon atoms, alkoxy radicals having 1 to 20 carbon atoms and aryl or substituted aryl radicals having 3 to 20 carbon atoms. In an embodiment, the three substituent groups are alkyl radicals having 1 to 20 carbon atoms, phenyl, naphthyl, or mixtures thereof. In an embodiment, the three groups are halogenated aryl groups, e.g., fluorinated aryl groups. In an embodiment, the neutral stoichiometric activator is tris perfluorophenyl boron or tris perfluoronaphthyl boron.

In an embodiment, ionic stoichiometric activator compounds may include an active proton, or some other cation associated with, but not coordinated to, or only loosely coordinated to the remaining ion of the ionizing compound. Suitable examples include compounds and the like described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206, 197; 5,241,025; 5,384,299; 5,502,124; and WO 1996/04319; all of which are herein fully incorporated by reference.

In an embodiment, compounds useful as an activator comprise a cation, which is, for example, a Bronsted acid capable of donating a proton, and a compatible non-coordinating anion which anion is relatively large (bulky), capable of stabilizing the active catalyst species (the Group 4 cation, e.g.) which is formed when the two compounds are combined and said anion will be sufficiently labile to be displaced by olefinic, diolefinic or acetylenically unsaturated substrates or other neutral Lewis bases, such as ethers, amines, and the like. Two classes of useful compatible non-coordinating anions are disclosed in EP 0 277,003 A1, and EP 0 277,004 A1, which include anionic coordination complexes comprising a plurality of lipophilic radicals covalently coordinated to and shielding a central charge-bearing metal or metalloid core; and anions comprising a plurality of boron atoms such as carboranes, metallacarboranes, and boranes.

In an embodiment, the stoichiometric activators include a cation and an anion component, and may be represented by the following formula (1):

$$(Z)_d^+(A^{d-}) \quad (1)$$

wherein Z is (L-H) or a reducible Lewis acid, L is a neutral Lewis base, H is hydrogen and (L-H)$^+$ is a Bronsted acid; A$^{d-}$ is a non-coordinating anion having the charge d-; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the catalyst precursor, resulting in a cationic transition metal species, or the activating cation (L-H)$_d^+$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: (Ar$_3$C$^+$), where Ar is aryl or aryl substituted with a heteroatom, or a C$_1$ to C$_{40}$ hydrocarbyl, the reducible Lewis acid may be represented by the formula: (Ph$_3$C$^+$), where Ph is phenyl or phenyl substituted with a heteroatom, and/or a C$_1$ to C$_{40}$ hydrocarbyl. In an embodiment, the reducible Lewis acid is triphenyl carbenium.

In a particularly preferred embodiment, the non-coordinating anion activator is represented by the formula:

$$(Z)_d^+(A^{d-})$$

wherein Z is (L-H), or a reducible Lewis acid, L is a neutral Lewis base, H is hydrogen and (L-H)$^+$ is a Bronsted acid; A$^{d-}$ is a non-coordinating anion having the charge d-; and d is an integer from 1 to 3, preferably Z is a reducible Lewis acid represented by the formula: (Ar$_3$C$^+$), where Ar is aryl radical, an aryl radical substituted with a heteroatom, an aryl radical substituted with one or more C$_1$ to C$_{40}$ hydrocarbyl radicals, an aryl radical substituted with one or more functional groups comprising elements from groups 13, 14, 15, 16, or 17 of the periodic table of the elements, or a combination thereof.

Embodiments of the anion component A$^{d-}$ include those having the formula [M$^k$+Q$_n$]$^{d-}$ wherein k is 1, 2, or 3; n is 1, 2, 3, 4, 5 or 6, or 3, 4, 5 or 6; n-k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable A$^{d-}$ components also include diboron compounds as disclosed in U.S. Pat. No. 5,447,895, which is fully incorporated herein by reference.

In an embodiment of the invention, the activator is represented by the formula:

$$(Z)_d^+(A^{d-})$$

wherein Z is (L-H), or a reducible Lewis acid, wherein L is a neutral Lewis base, H is hydrogen and (L-H)$^+$ is a Bronsted acid;

wherein A$^{d-}$ is a non-coordinating anion having the charge d-; and wherein d is an integer from 1 to 3.

In an embodiment of the invention, the activator is represented by the formula:

$$(Z)_d^+(A^{d-})$$

wherein A$^{d-}$ is a non-coordinating anion having the charge d-;

d is an integer from 1 to 3, and

Z is a reducible Lewis acid represented by the formula: (Ar$_3$C$^+$), where Ar is aryl radical, an aryl radical substituted with a heteroatom, an aryl radical substituted with one or more C$_1$ to C$_{40}$ hydrocarbyl radicals, an aryl radical substituted with one or more functional groups comprising elements from groups 13, 14, 15, 16, or 17 of the periodic table of the elements, or a combination thereof.

In an embodiment in any of the NCA's represented by Formula 1 described above, the anion component A$^{d-}$ is represented by the formula [M*$^{k*}$+Q*$_n$*]$^{d*-}$ wherein k* is 1, 2, or 3; n* is 1, 2, 3, 4, 5, or 6 (or 1, 2, 3, or 4); n*-k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

This invention also relates to a method to polymerize olefins comprising contacting olefins (such as ethylene) with a bridged bis(indenyl)metallocene catalyst compound as described above and an NCA activator represented by the Formula (2):

$$R_nM^{**}(ArNHal)_{4-n} \quad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is $Z_d^+$ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl radicals; —SR$^a$, —NR$^a{}_2$, and —PR$^a{}_2$, where each R$^a$ is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: ($Ar_3C+$), where Ar is aryl or aryl substituted with a heteroatom, and/or a $C_1$ to $C_{40}$ hydrocarbyl, or the reducible Lewis acid represented by the formula: ($Ph_3C+$), where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, $(L-H)_d^+$, wherein L is an neutral Lewis base; H is hydrogen; (L-H) is a Bronsted acid; and d is 1, 2, or 3, or $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \quad (3)$$

wherein $OX^{e+}$ is a cationic oxidizing agent having a charge of e+; e is 1, 2 or 3; d is 1, 2 or 3; and $A^{d-}$ is a non-coordinating anion having the charge of d- (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

In an embodiment, the bridged bis(indenyl)metallocene catalyst compounds, described herein can be used with bulky activators. A "bulky activator" as used herein refers to anionic activators represented by the formula:

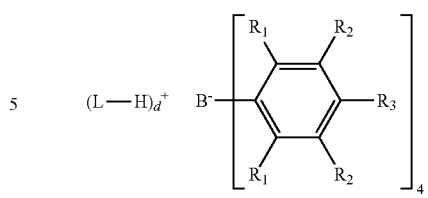

where:
each $R_1$ is, independently, a halide, or a fluoride;
each $R_2$ is, independently, a halide, a $C_6$ to $C_{20}$ substituted aromatic hydrocarbyl radical or a siloxy group of the formula —O—S—$R_a$, where $R_a$ is a $C_1$ to $C_{20}$ hydrocarbyl or hydrocarbylsilyl radical (or $R_2$ is a fluoride or a perfluorinated phenyl radical);
each $R_3$ is a halide, $C_6$ to $C_{20}$ substituted aromatic hydrocarbyl radical or a siloxy group of the formula —O—Si—$R_a$, where $R_a$ is a $C_1$ to $C_{20}$ hydrocarbyl radical or hydrocarbylsilyl group (or $R_3$ is a fluoride or a $C_6$ perfluorinated aromatic hydrocarbyl radical); wherein $R_2$ and $R_3$ can form one or more saturated or unsaturated, substituted or unsubstituted rings (or $R_2$ and $R_3$ form a perfluorinated phenyl ring);
L is an neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, or greater than 300 cubic Å, or greater than 500 cubic Å.

As discussed above, "molecular volume" is used herein as an approximation of spatial steric bulk of an activator molecule in solution. Exemplary bulky substituents of activators suitable herein and their respective scaled volumes and molecular volumes are shown in the table below. The dashed bonds indicate binding to boron, as in the general formula above.

Exemplary bulky activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators include: N,N-dimethylanilinium tetrakis(perfluoronaphthyeborate, N,N-dimethylanilinium tetrakis(perfluorobiphenyeborate, N,N-dimethylanilinium tetrakis(3,5-bis(trifluoromethyl)phenyeborate, triphenylcarbenium tetrakis(perfluoronaphthyl)borate, triphenylcarbenium tetrakis(perfluorobiphenyeborate, triphenylcarbenium tetrakis(3,5-bis(trifluoromethyl)phenyeborate, triphenylcarbenium tetrakis(perfluorophenyl)borate, $[Ph_3C^+][B(C_6F_5)_4^-]$, $[Me_3NH^+][B(C_6F_5)_4^-]$; 1-(4-(tris(pentafluorophenyeborate)-2,3,5,6-tetrafluorophenyl)pyrrolidinium; and tetrakis(pentafluorophenyl)borate, 4-(tris(pentafluorophenyeborate)-2,3,5,6-tetrafluoropyridine.

In an embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyeborate).

In an embodiment, any of the activators described herein may be mixed together before or after combination with the catalyst compound and/or CTA and/or NCA, or before being mixed with the catalyst compound and/or CTA, and/or NCA.

In an embodiment, two NCA activators may be used in the polymerization and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

In an embodiment, the NCA activator-to-catalyst ratio is a 1:1 molar ratio, or 0.1:1 to 100:1, or 0.5:1 to 200:1, or 1:1 to 500:1 or 1:1 to 1000:1. In an embodiment, the NCA activator-to-catalyst ratio is 0.5:1 to 10:1, or 1:1 to 5:1.

In an embodiment, the catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator, all of which are incorporated by reference herein).

Scavengers or Co-Activators

In an embodiment, the catalyst system may further include scavengers and/or co-activators. Suitable aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, alumoxane, and the like. Other oxophilic species such as diethyl zinc may be used.

Catalyst Supports

In an embodiment, the catalyst system may comprise an inert support material. In an embodiment, the support material comprises a porous support material, for example, talc, and/or inorganic oxides. Other suitable support materials include zeolites, clays, organoclays, or any other organic or inorganic support material and the like, or mixtures thereof.

In an embodiment, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, and/or alumina include magnesia, titania, zirconia, montmorillonite, phyllosilicate, and/or the like. Other suitable support materials include finely divided functionalized polyolefins, such as finely divided polyethylene.

In an embodiment, the support material may have a surface area in the range of from about 10 to about 700 m$^2$/g, pore volume in the range of from about 0.1 to about 4.0 cc/g and average particle size in the range of from about 5 to about 500 μm, or the surface area of the support material is in the range of from about 50 to about 500 m$^2$/g, pore volume of from about 0.5 to about 3.5 cc/g and average particle size of from about 10 to about 200 μm. In an embodiment, a majority portion of the surface area of the support material is in the range of from about 100 to about 400 m$^2$/g, pore volume from about 0.8 to about 3.0 cc/g and average particle size is from about 5 to about 100 μm. In an embodiment, the average pore size of the support material is in the range of from 10 to 1000 Å, or 50 to about 500 Å, or 75 to about 350 Å. In an embodiment, the support material is a high surface area, amorphous silica having a surface area greater than or equal to about 300 m$^2$/gm, and/or a pore volume of 1.65 cm$^3$/gm. Suitable silicas are marketed under the tradenames of Davison 952 or Davison 955 by the Davison Chemical Division of W.R. Grace and Company. In an embodiment, the support may comprise Davison 948.

In an embodiment, the support material should be essentially dry, that is, essentially free of absorbed water. Drying of the support material can be effected by heating or calcining at about 100° C. to about 1000° C., or at a temperature of at least about 400° C., or 500° C., or 600° C. When the support material is silica, it is heated to at least 200° C., or about 200° C. to about 850° C., or at least 600° C. for a time of about 1 minute to about 100 hours, or from about 12 hours to about 72 hours, or from about 24 hours to about 60 hours. In an embodiment, the calcined support material must have at least some reactive hydroxyl (OH) groups to produce supported catalyst systems according to the instant disclosure.

In an embodiment, the calcined support material is contacted with at least one polymerization catalyst comprising at least one catalyst compound and an activator. In an embodiment, the support material, having reactive surface groups, typically hydroxyl groups, is slurried in a non-polar solvent and the resulting slurry is contacted with a solution of a catalyst compound and an activator. In an embodiment, the slurry of the support material is first contacted with the activator for a period of time in the range of from about 0.5 hours to about 24 hours, or from about 2 hours to about 16 hours, or from about 4 hours to about 8 hours. The solution of the catalyst compound is then contacted with the isolated support/activator. In an embodiment, the supported catalyst system is generated in situ. In alternate embodiment, the slurry of the support material is first contacted with the catalyst compound for a period of time in the range of from about 0.5 hours to about 24 hours, or from about 2 hours to about 16 hours, or from about 4 hours to about 8 hours. The slurry of the supported catalyst compound is then contacted with the activator solution.

In an embodiment, the mixture of the catalyst, activator and support is heated to about 0° C. to about 70° C., or to about 23° C. to about 60° C., or to 25° C. (room temperature). Contact times typically range from about 0.5 hours to about 24 hours, or from about 2 hours to about 16 hours, or from about 4 hours to about 8 hours.

Suitable non-polar solvents are materials in which all of the reactants used herein, i.e., the activator and the catalyst compound are at least partially soluble and which are liquid at reaction temperatures. Suitable non-polar solvents include alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In an embodiment, a polymerization processes includes contacting monomers (such as ethylene and propylene), and optionally comonomers, with a catalyst system comprising an activator and at least one embodiment of a catalyst precursor compound according to the invention. In an embodiment, the catalyst compound and activator may be combined in any order, and may be combined prior to contacting with the monomer. In an embodiment, the catalyst compound and/or the activator are combined after contacting with the monomer.

In an embodiment, a process comprises: contacting one or more olefins with a catalyst system at polymerization conditions to produce a polyolefin, the catalyst system comprising an activator and a racemic bridged bis(indenyl)metallocene transition metal compound represented by the formula:

In an embodiment, a process comprises contacting one or more olefins with a catalyst system at polymerization conditions to produce a polyolefin, the catalyst system comprising an activator and a racemic bridged bis(indenyl)metallocene transition metal compound according to any one of the embodiments disclosed herein.

In a particular embodiment, a process comprises contacting one or more olefins with a catalyst system at polymerization conditions to produce a polyolefin, the catalyst system comprising an activator, or combination of activators, and a racemic bridged bis(indenyl)metallocene transition metal compound represented by the formula:

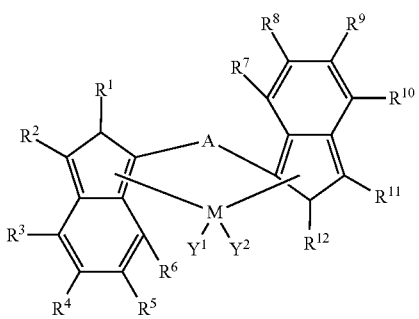

wherein M is a Group 4, 5, or 6 metal of the periodic table of the elements;

wherein A is a divalent radical comprising a $C_1$-$C_{20}$ hydrocarbyl radical, a functional group comprising elements from groups 13, 14, 15, 16, or 17 of the periodic table of the elements, or combinations thereof;

wherein each of $Y^1$ and $Y^2$ is, independently, —$OR^a$—$SR^a$, —$NR^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$; and wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising elements from groups 13, 14, 15, 16, or 17 of the periodic table of the elements, or combinations thereof.

In an embodiment of the invention, the polymerization conditions comprise a temperature of from about 0° C. to about 300° C., a pressure from about 0.35 MPa to about 10 MPa, and a time from about 0.1 minutes to about 24 hours. In an embodiment of the invention, one or more olefins comprise propylene. In a particular embodiment of the invention, the polyolefin comprises at least 50 mole % propylene. In an embodiment of the invention, the catalyst system, and/or the polyolefin produced comprises less than about 0.01 wt % of fluoride, chloride, bromide, iodide, or a combination thereof.

In an embodiment, a process comprises:

A) contacting a deprotonated bridged bis(indenyl) compound with a rac-directing metallation reagent to form a product mixture enriched in a racemic isomer of a bridged bis(indenyl)metallocene catalyst precursor relative to any meso isomer formed, wherein the rac-directing metallation reagent is represented by the formula:

$M^d X_e Y_f Z_g$ (preferably $M^* X_2 Y_2 Z_2$, where $M^*$ is a group 4 metal);

and wherein the rac-bis(indenyl)metallocene catalyst precursor is represented by the formula:

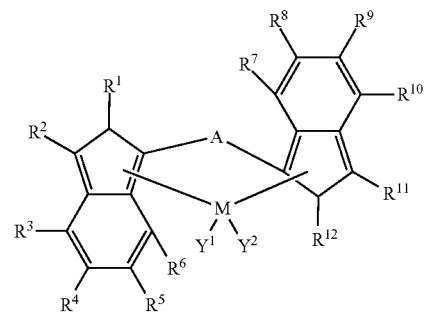

wherein d is the coordination number of the metal, M, and is 4, 5 or 6, e is 2, 3, 4 or 5, f is 1, 2, 3 or 4 and g is 0, 1 or 2, where e+f=d;

wherein M is a Group 4, 5 or 6 metal of the periodic table of the elements;

wherein A is a divalent radical comprising a $C_1$-$C_{20}$ hydrocarbyl radical, a functional group comprising elements from groups 13, 14, 15, 16, or 17 of the periodic table of the elements, or a combination thereof;

wherein each X is a halogen, a triflate or a pseudohalogen;

each Y is, independently, —$OR^a$—$SR^a$, —$NR^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$; and wherein each of $Y^1$ and $Y^2$ is independently, —$OR^a$—$SR^a$, —$NR^a_{2\ and\ —P(R^a)}(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$; wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising an element from groups 13, 14, 15, 16, or 17 of the periodic table of the elements, or a combination thereof; and wherein each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof;

B) contacting the bridged bis(indenyl)metallocene catalyst precursor with an activator to form a catalyst system;

C) optionally supporting the catalyst compound and or activator before or after step (B), and D) contacting one or more olefins with the catalyst system at polymerization conditions to produce a polyolefin.

In an embodiment, the deprotonated bridged bis(indenyl) compound may be contacted with the rac-directing metallation reagent in the presence of the activator, in the presence of one or more olefins, or a combination thereof.

In an embodiment of the invention, the bridged bis(indenyl)metallocene catalyst precursor may be contacted with a labile group replacement reagent to replace each of $Y^1$ and $Y^2$ with a labile group selected from the group consisting of halogen, benzyl, phenyl, or a combination thereof, prior to contacting the bridged bis(indenyl)metallocene catalyst precursor with an activator to form a catalyst system.

In an embodiment, the labile group replacement reagent is chlorotrimethylsilane, HCl, HBr, HI, $SOCl_2$, or a combination thereof. In an embodiment of the invention, the deprotonated bridged bis(indenyl) compound is contacted with the rac-directing metallation reagent in the presence of the activator, in the presence of the one or more olefins, (i.e., an in-situ generated catalyst) or a combination thereof.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment of the invention, the monomer comprises propylene and an optional comonomers comprising one or more of ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In an embodiment, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In an embodiment, one or more dienes are present in the polymer produced herein at up to 10 weight %, or at 0.00001 to 1.0 weight %, or 0.002 to 0.5 weight %, or 0.003 to 0.2 weight %, based upon the total weight of the composition. In an embodiment, 500 ppm or less of diene is added to the polymerization, or 400 ppm or less, or 300 ppm or less. In an embodiment, at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment, the diolefin monomers may be selected from alpha, omega-diene monomers (i.e. di-vinyl monomers). In another embodiment, the diolefin monomers are linear di-vinyl monomers, most or those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In an embodiment of the invention, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes according to the instant disclosure may be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are suitable for use herein, wherein a homogeneous polymerization process is defined to be a process where at least 90 wt % of the product is soluble in the reaction media. A bulk homogeneous process is suitable for use herein, wherein a bulk process is defined to be a process where monomer concentration in all feeds to the reactor is 70 volume % or more. In an embodiment, no solvent or diluent is present or added in the reaction medium (except for the small amounts used as the carrier for the catalyst system or other additives, or amounts typically found with the monomer; e.g., propane in propylene). In an embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (IsoparTM); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment, the solvent is not aromatic, or aromatics are present in the solvent at less than 1 wt %, or less than 0.5 wt %, or less than 0.0 wt % based upon the weight of the solvents.

In an embodiment, the feed concentration of the monomers and comonomers for the polymerization is 60 vol % solvent or less, or 40 vol % or less, or 20 vol % or less, based on the total volume of the feedstream. Or the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., or about 20° C. to about 200° C., or about 35° C. to about 150° C., or from about 40° C. to about 120° C., or from about 45° C. to about 80° C.; and at a pressure in the range of from about 0.35 MPa to about 10 MPa, or from about 0.45 MPa to about 6 MPa, or from about 0.5 MPa to about 4 MPa.

In an embodiment, the run time of the reaction is from about 0.1 minutes to about 24 hours, or up to 16 hours, or in the range of from about 5 to 250 minutes, or from about 10 to 120 minutes.

In an embodiment, hydrogen is present in the polymerization reactor at a partial pressure of 0.001 to 50 psig (0.007 to 345 kPa), or from 0.01 to 25 psig (0.07 to 172 kPa), or 0.1 to 10 psig (0.7 to 70 kPa).

In an embodiment, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment, the polymerization conditions include one or more of the following: 1) temperatures of 0 to 300° C. (or 25 to 150° C., or 40 to 120° C., or 45 to 80° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; or where aromatics are or present in the solvent at less than 1 wt %, or less than 0.5 wt %, or at 0 wt % based upon the weight of the solvents); 4) wherein the catalyst system used in the polymerization comprises less than 0.5 mol %, or 0 mol % alumoxane, or the alumoxane is present at a molar ratio of aluminum to transition metal less than 500:1, or less than 300:1, or less than 100:1, or less than 1:1; 5) the polymerization occurs in one reaction zone; 6) the productivity of the catalyst compound is at least 80,000 g/mmol/hr (or at least 150,000 g/mmol/hr, or at least 200,000 g/mmol/hr, or at least 250,000 g/mmol/hr, or at least 300,000 g/mmol/hr); 7) scavengers (such as trialkyl aluminum compounds) are absent (e.g., present at zero mol %) or the scavenger is present at a molar ratio of scavenger to transition metal of less than 100:1, or less than 50:1, or less than 15:1, or less than 10:1; and/or 8) optionally hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone.

In an embodiment, a process to polymerize olefins comprises contacting one or more olefins with a catalyst system according to any one or combination of embodiments disclosed herein at polymerization conditions to produce a polyolefin.

In a particular embodiment, the polymerization conditions comprise a temperature of from about 0° C. to about 300° C., a pressure from about 0.35 MPa to about 10 MPa, and a time from about 0.1 minutes to about 24 hours. In an embodiment, the one or more olefins comprise propylene. In an embodiment, the polyolefin comprises at least 50 mole % propylene.

Polyolefin Products

The instant disclosure also relates to compositions of matter produced by the methods described herein.

In an embodiment, the process described herein produces propylene homopolymers or propylene copolymers, such as propylene-ethylene and/or propylene-a-olefin (or $C_3$ to $C_{20}$) copolymers (such as propylene-hexene copolymers or propylene-octene copolymers) having a Mw/Mn of greater than 1 to 4 (or greater than 1 to 3).

Likewise, the process of this invention produces olefin polymers, or polyethylene and polypropylene homopolymers and copolymers. In an embodiment, the polymers produced herein are homopolymers of ethylene or propylene, are copolymers of ethylene or having from 0 to 25 mole % (or from 0.5 to 20 mole %, or from 1 to 15 mole %, or from 3 to 10 mole %) of one or more $C_3$ to $C_{20}$ olefin comonomer (or $C_3$ to $C_{12}$ alpha-olefin, or propylene, butene, hexene, octene, decene, dodecene, or propylene, butene, hexene, octene), or are copolymers of propylene or having from 0 to 25 mole % (or from 0.5 to 20 mole %, or from 1 to 15 mole %, or from 3 to 10 mole %) of one or more of $C_2$ or $C_4$ to $C_{20}$ olefin comonomer (or ethylene or $C_4$ to $C_{12}$ alpha-olefin, or ethylene, butene, hexene, octene, decene, dodecene, or ethylene, butene, hexene, octene).

In an embodiment, the polymers produced herein have an Mw of 5,000 to 1,000,000 g/mol (e.g., 25,000 to 750,000 g/mol, or 50,000 to 500,000 g/mol), and/or an Mw/Mn of greater than 1 to 40, or 1.2 to 20, or 1.3 to 10, or 1.4 to 5, or 1.5 to 4, or 1.5 to 3.

In an embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated Mw, Mn, MWD are determined by GPC as described in US 2006/0173123 pages 24-25, paragraphs [0334] to [0341].

In an embodiment, the polyolefin has a concentration of isotactic pentads [mmmm] of greater than or equal to about 50 wt %, or 60 wt %, or 70 wt %, or 80 wt %, or 90 wt %, or greater than or equal to about 99 wt %, based on the total weight of the polymer.

In an embodiment, the polyolefin comprises at least 50 mole % propylene and has a melting point $T_{melt}$ determined using differential scanning calorimetry from about 145° C. to about 165° C. Within this range, in an embodiment, the polyolefin has a melting point $T_{melt}$ of greater than or equal to about 148° C., or greater than or equal to about 150° C., or greater than or equal to about 152° C., or greater than or equal to about 154° C., or greater than or equal to about 155° C., or greater than or equal to about 156° C., or greater than or equal to about 157° C., or greater than or equal to about 158° C., or greater than or equal to about 159° C., or greater than or equal to about 160° C.

In an embodiment of the invention, a polyolefin according to any one or more embodiments disclosed herein comprises a polyolefin produced according to any one or combination of embodiments disclosed herein. In an embodiment of the invention, an article comprises a polyolefin produced according to any one or combination of embodiments disclosed herein. A particular embodiment of the invention is a polyolefin produced according to a process comprising:

A) contacting a deprotonated bridged bis(indenyl) compound with a rac-directing metallation reagent to form a product mixture enriched in a racemic isomer of a bridged bis(indenyl)metallocene catalyst precursor relative to any meso isomer formed, wherein the rac-directing metallation reagent is represented by the formula:

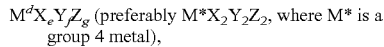
$M^d X_e Y_f Z_g$ (preferably $M^* X_2 Y_2 Z_2$, where $M^*$ is a group 4 metal), where M, X, Y and Z are as defined below and d is the coordination number of the metal, M, and is 4, 5 or 6, e is 2, 3, 4 or 5, f is 1, 2, 3 or 4 and g is 0, 1 or 2, where e+f=d; and wherein the rac-bis(indenyl)metallocene catalyst precursor is represented by the formula:

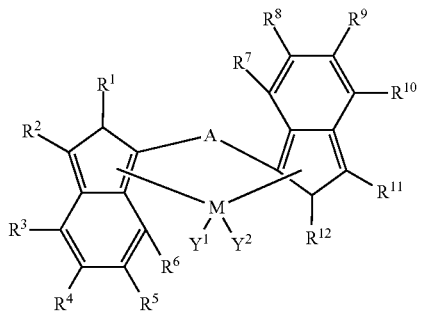

wherein M is a Group 4, 5, or 6 metal of the periodic table of the elements;
wherein A is a divalent radical comprising a $C_1$-$C_{20}$ hydrocarbyl radical, a functional group comprising elements from groups 13, 14, 15, 16, or 17 of the periodic table of the elements, or a combination thereof;
wherein each X is a halogen, a triflate or a pseudohalogen;
each Y is, independently, —$OR^a$—$SR^a$, —$NR^a{}_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $Y^1$ and $Y^2$ is independently, —$OR^a$—$SR^a$, —$NR^a{}_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising an element from groups 13, 14, 15, 16, or 17 of the periodic table of the elements, or a combination thereof; and
wherein each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof;

B) contacting the bridged bis(indenyl)metallocene catalyst precursor with an activator to form a catalyst system;
C) optionally supporting the catalyst, activator and/or catalyst system before or after step (B); and
D) contacting one or more olefins with the catalyst system at polymerization conditions to produce a polyolefin.

Blends

In an embodiment, the polymer (for example, the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In an embodiment, the polymer (or the polyethylene or polypropylene) is present in the above blends, at from 10 to 99 wt %, based upon the weight of the polymers in the blend, or 20 to 95 wt %, or at least 30 to 90 wt %, or at least 40 to 90 wt %, or at least 50 to 90 wt %, or at least 60 to 90 wt %, or at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba- Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

In an embodiment, any of the foregoing polymers, such as the foregoing polypropylenes or blends thereof, may be used in a variety of end-use applications. Applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film, then oriented. Likewise, oriented polypropylene could be laminated to oriented polyethylene or oriented polyethylene could be coated onto polypropylene, then optionally the combination could be oriented even further. Typically the films are oriented in the machine direction (MD) at a ratio of up to 15, or between 5 and 7, and in the transverse direction (TD) at a ratio of up to 15, or 7 to 9. However, in an embodiment, the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In an embodiment, one or more layers may be modified by corona treatment, electron beam irradiation, gamma irradiation, flame treatment, or microwave. In an embodiment, one or both of the surface layers is modified by corona treatment.

Molded Products

The compositions described herein (or polypropylene compositions) may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein (or polypropylene compositions) may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING, pp. 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 μm to 2540 μm (10 mils to 100 mils), although any given sheet may be substantially thicker.

Non-Wovens and Fibers

The polyolefin compositions described above may also be used to prepare nonwoven fabrics and fibers of this invention in any nonwoven fabric and fiber making process, including but not limited to, melt blowing, spunbonding, film aperturing, and staple fiber carding. A continuous filament process may also be used. Or a spunbonding process is used. The spunbonding process is well known in the art. Generally it involves the extrusion of fibers through a spinneret. These fibers are then drawn using high velocity air and laid on an endless belt. A calendar roll is generally then used to heat the web and bond the fibers to one another although other techniques may be used such as sonic bonding and adhesive bonding.

Embodiments

Accordingly, the instant disclosure relates to the following embodiments:

E1. A process comprising:

contacting a deprotonated bridged bis(indenyl) compound with a rac-directing metallation reagent to form a product mixture enriched in a racemic isomer of a bridged bis(indenyl)metallocene transition metal compound relative to any meso isomer formed, wherein the rec-directing metallation reagent is represented by the formula:

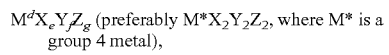 (preferably M*X$_2$Y$_2$Z$_2$, where M* is a group 4 metal), where M, X, Y and Z are as defined below and d is the coordination number of the metal, M, and is 4, 5 or 6, e is 2, 3, 4 or 5, f is 1, 2, 3 or 4 and g is 0, 1 or 2, where e+f=d;

wherein the bis(indenyl)metallocene transition metal compound is represented by the formula:

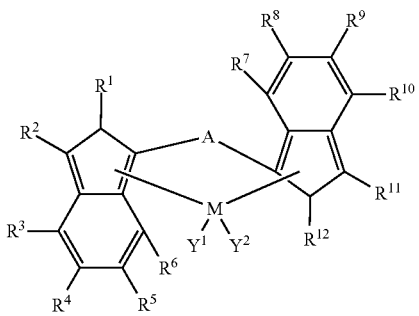

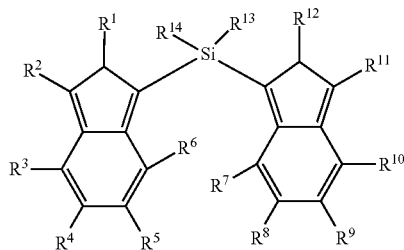

wherein each of $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is independently, a hydrogen, a halogen, a $C_1$-$C_{20}$ hydrocarbyl radical, a functional group comprising elements from groups 13, 14, 15, 16, or 17 of the periodic table of the elements, or a combination thereof.

E6. The process according to any one of Embodiments E1 to E5, wherein $R^{13}$ and $R^{14}$ are independently a $C_1$-$C_{10}$ hydrocarbyl radical.

E7. The process according to any one of Embodiments E1 to E6, wherein $R^1$ and $R^{12}$ each comprise a $C_1$-$C_{10}$ hydrocarbyl radical.

E8. The process according to any one of Embodiments E1 to E7, further comprising contacting the bridged bis(indenyl) metallocene transition metal compound with a labile group replacement reagent to replace $Y^1$ and $Y^2$ in the bridged bis(indenyl)metallocene transition metal compound with a labile group selected from the group consisting of halogen, benzyl, phenyl, or a combination thereof.

E9. The process according to Embodiment E8, wherein the labile group replacement reagent is chlorotrimethylsilane, HCl, HBr, HI, $SOCl_2$, or a combination thereof.

E10. The process according to any one of Embodiments E1 to E9, further comprising contacting the bridged bis(indenyl) metallocene transition metal compound with an activator to form a catalyst system.

E11. The process according to Embodiment E10, wherein the activator comprises alumoxane, a non-coordinating anion activator, or a combination thereof.

E12. The process according to Embodiment E10 or E11, wherein the activator comprises alumoxane and the alumoxane is present at a ratio of 1 mole aluminum or more to mole of bridged bis(indenyl)metallocene transition metal compound.

E13. The compound produced according to the process of any one of Embodiments E1-E7.

E14. A compound, comprising a bridged bis(indenyl)metallocene transition metal compound represented by the formula:

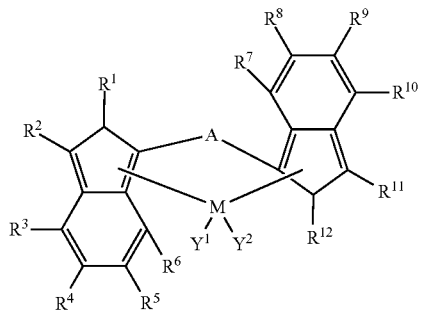

wherein M is a Group 4, 5, or 6 metal of the periodic table of the elements;

wherein M is a Group 4, 5, or 6 metal of the periodic table of the elements;
wherein A is a divalent radical comprising a $C_1$-$C_{20}$ hydrocarbyl radical, a functional group comprising elements from groups 13, 14, 15, 16, or 17 of the periodic table of the elements, or a combination thereof;
wherein each X is a halogen, a triflate or pseudohalogen;
each Y is, independently, $—OR^a$, $—SR^a$, $—NR^a_2$ and $—P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $Y^1$ and $Y^2$ is, independently, $—OR^a$—$SR^a$, $—NR^a_2$ and $—P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising an element from groups 13, 14, 15, 16, or 17 of the periodic table of the elements, or a combination thereof; and
wherein each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof.

E2. The process according to Embodiment E1, wherein the product mixture (prior to any recrystallization or fractionation) comprises more than 90 mol % of the racemic isomer based on the total amount of the bis(indenyl)metallocene transition metal compound formed.

E3. The process according to Embodiment E1 or Embodiment E2, wherein the bridged bis(indenyl)metallocene transition metal compound formed consists essentially of the racemic isomer.

E4. The process according to any one of Embodiments E1 to E3, wherein
A is dimethyl silyl;
X is Cl;
each Y is -O-iPr, or —O-tBu; and
Z comprises a tetrahydrofuranyl radical.

E5. The process according to any one of Embodiments E1 to E4, wherein the bridged bis(indenyl) transition metal compound is represented by the formula:

wherein A is a divalent radical comprising a $C_1$-$C_{20}$ hydrocarbyl radical, a functional group comprising elements from groups 13, 14, 15, 16, or 17 of the periodic table of the elements, or combinations thereof;

wherein each of $Y^1$ and $Y^2$ is, independently, —$OR^a$—$SR^a$, —$NR^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$; and wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising elements from groups 13, 14, 15, 16, or 17 of the periodic table of the elements, or combinations thereof.

E15. The compound of Embodiment E13 or Embodiment E14 comprising greater than 50 mol % of a racemic isomer of the bridged bis(indenyl)metallocene transition metal compound based on the total amount of the compound present.

E16. The compound according to any one of Embodiments E13 to E15, wherein M is Zr, A is a dimethyl silyl, and $R^1$ and $R^{12}$ are methyl.

E17. The compound according to any one of Embodiments E13 to E16, wherein the racemic bridged bis(indenyl)metallocene transition metal compound is bis[4-(o-tolyl)-2-methylindenyl]Zr(Ot-Bu)$_2$.

E18. A process comprising contacting one or more olefins with the catalyst system obtained according to the process of any one of Embodiments E10 to E12 at polymerization conditions to produce a polyolefin E19. A process according to Embodiment E18, wherein the polymerization conditions comprise a temperature of from about 0° C. to about 300° C., a pressure from about 0.35 MPa to about 10 MPa, and a time from about 0.1 minutes to about 24 hours.

E20. A process according to Embodiment E18 or Embodiment E19, wherein the one or more olefins comprise propylene.

E21. A process according to any one of Embodiments E18 to E20, wherein the polyolefin comprises at least 50 mole % propylene.

E22. A process according to any one of Embodiments E18 to E21, wherein the catalyst system comprises less than about 0.01 wt % of fluoride, chloride, bromide, iodide, or a combination thereof.

E23. A process comprising:
A) contacting a deprotonated bridged bis(indenyl) compound with a rac-directing metallation reagent to form a product mixture enriched in a racemic isomer of a bridged bis(indenyl)metallocene catalyst precursor relative to any meso isomer formed, wherein the rac-directing metallation reagent is represented by the formula:

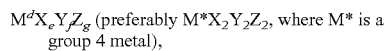

where M, X, Y and Z are as defined below and d is the coordination number of the metal, M, and is 4, 5 or 6, e is 2, 3, 4 or 5, f is 1, 2, 3 or 4 and g is 0, 1 or 2, where e+f=d;
wherein the rac-bis(indenyl)metallocene catalyst precursor is represented by the formula:

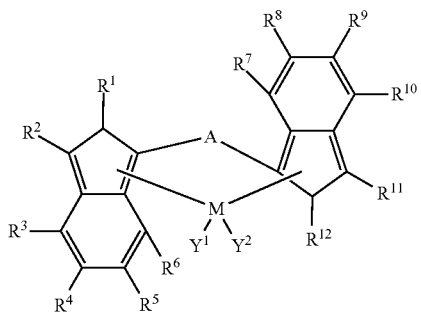

wherein M is a Group 4, 5, or 6 metal of the periodic table of the elements;
wherein A is a divalent radical comprising a $C_1$-$C_{20}$ hydrocarbyl radical, a functional group comprising elements from groups 13, 14, 15, 16, or 17 of the periodic table of the elements, or a combination thereof;
wherein each X is a halogen, a triflate or pseudohalogen;
each Y is, independently, —$OR^a$—$SR^a$, —$NR^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $Y^1$ and $Y^2$ is, independently, —$OR^a$—$SR^a$, —$NR^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising an element from groups 13, 14, 15, 16, or 17 of the periodic table of the elements, or a combination thereof; and
wherein each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof;
B) contacting the bridged bis(indenyl)metallocene catalyst precursor with an activator to form a catalyst system;
C) optionally, supporting the catalyst compound, activator or catalyst system before or after step (B); and
D) contacting one or more olefins with the catalyst system at polymerization conditions to produce a polyolefin.

E24. The process according to Embodiment E23, further comprising contacting the bridged bis(indenyl)metallocene catalyst precursor with a labile group replacement reagent to replace $Y^1$ and $Y^2$ with a labile group selected from the group consisting of halogen, benzyl, phenyl, or a combination thereof, prior to said contacting the bridged bis(indenyl)metallocene catalyst precursor with an activator to form a catalyst system.

E25. The process according to Embodiment E24, wherein the labile group replacement reagent is chlorotrimethylsilane, HCl, HBr, HI, SOCl$_2$, or a combination thereof.

E26. The process according to any one of Embodiments E23 to E25, wherein the deprotonated bridged bis(indenyl) compound is contacted with the rac-directing metallation reagent in the presence of the activator, the one or more olefins, or a combination thereof.

E27. A polymer produced according to any one of Embodiments E23 to E26.

E28. The process according to any one of Embodiments E1 to E12 or E18 to E26, wherein the racemic enriched bridged bis(indenyl)metallocene transition metal compound is produced without subsequent crystallization to remove meso isomer.

E29. The process according to any one of Embodiments E1 to E12, E18 to E26 or E28, further comprising supporting the racemic enriched bridged bis(indenyl)metallocene transition metal compound on a support material.

E30. The compound according to any one of Embodiments E13 to E17, wherein the racemic bridged bis(indenyl)metallocene transition metal compound is supported on a support material.

This invention also relates to:

A1. A process comprising:

A) contacting a deprotonated bridged bis(indenyl) compound with a rac-directing metallation reagent to form a product mixture enriched in a racemic isomer of a bridged bis(indenyl)metallocene catalyst precursor relative to any meso isomer formed, wherein the rac-directing metallation reagent is represented by the formula:

$MX_2Y_2Z_2$, and wherein the rac-bis(indenyl)metallocene catalyst precursor is represented by the formula:

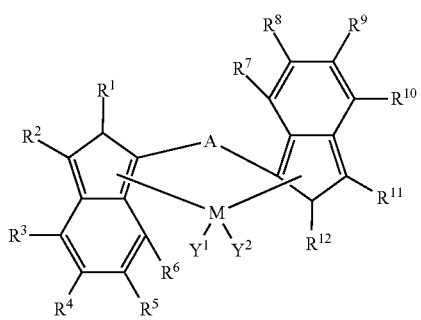

wherein M is a Hf, Zr or Ti;

wherein A is a divalent radical comprising a $C_1$-$C_{20}$ hydrocarbyl radical, a functional group comprising elements from groups 13, 14, 15, 16, or 17 of the periodic table of the elements, or a combination thereof;

wherein each X is a halogen, a triflate or pseudohalogen;

each Y is, independently, —$OR^a$, —$SR^a$, —$NR^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;

wherein each of $Y^1$ and $Y^2$ is, independently, —$OR^a$—$SR^a$, —$NR^a_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;

wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising an element from groups 13, 14, 15, 16, or 17 of the periodic table of the elements, or a combination thereof, provided that $R^1$ and $R^{12}$ are, independently, a $C_1$ to $C_{12}$ alkyl group and $R^3$ and $R^{10}$ are a substituted or unsubstituted phenyl group; and wherein each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof;

B) contacting the bridged bis(indenyl)metallocene catalyst precursor with an activator to form a catalyst system; and C) contacting one or more olefins with the catalyst system at polymerization conditions to produce a polyolefin.

A2. The process of paragraph A1 where the activator comprises alumoxane.

A3. The process of paragraph A1 where the activator comprises alumoxane and a non-coordinating anion activator.

A4. The process of paragraph A1 wherein an alumoxane is contacted with the rac-bis(indenyl)metallocene catalyst precursor before a non-coordinating anion activator is contacted with the rac-bis(indenyl)metallocene catalyst precursor.

A5. The process of paragraph A1 where alumoxane is present at a ratio of alumoxane to rac-bis(indenyl)metallocene catalyst precursor of 100:1 to 1:1.

EXPERIMENTAL $^1$H NMR was performed as follows: $^1$H NMR data were collected at 25° C. in a 5 mm probe using a spectrometer (Bruker) with a $^1$H frequency of 400 MHz using deuterated chloroform as solvent. Data was recorded using a maximum pulse width of 45°, 8 seconds between pulses and signal averaging 16 transients. The spectrum is normalized to protonated chloroform in the deuterated chloroform having a peak at 7.27 ppm.

Examples

The foregoing discussion can be further described with reference to the following non-limiting examples.

The compound $ZrCl_2(O\text{-}t\text{-}Bu)_2(thf)_2$ was utilized as a rac-directing metallation reagent according to an embodiment of the invention. Deprotonation of a dimethylsilyl-bridged bis(indene) and introduction of this compound as a metallation reagent in the place of a metal tetrahalide results, in many instances, in clean isolation consisting essentially of the rac product without the need for repeated crystallizations or other purification schemes directed towards removal of any meso isomer formed. Alternately the use of the rac-directing metallation reagent leads to increase rac content and less need for crystallization or other purification.

Example 1

Bis[4-(o-tolyl)-2-methylindenyl]dimethylsilane was contacted with two equivalents of n-butyllithium, and stirred for three hours to produce a deprotonated bridged bis(4-(o-tolyl)-2-methylindenyl) compound. At this point, the reaction mixture was cooled to -75° C. The deprotonated bridged bis(4-

(o-tolyl)-2-methylindenyl) compound was then contacted with stoichiometric equivalents of $ZrCl_2(O\text{-}t\text{-}Bu)_2(thf)_2$ (see Njua, E. Y. et al., *Inorg. Chem.*, 2010, 49, 2163 for a preparation method for $ZrCl_2(O\text{-}t\text{-}Bu)_2(thf)_2$), which was introduced into the reaction mixture as a solid. The product mixture was allowed to warm to room temperature (25° C.) while stirring overnight. Upon concentration, filtration, and drying, a crude product was obtained. The crude product was slurried in ether and the bridged bis(4-(o-tolyl)-2-methylindenyemetallocene product was isolated as a yellow solid upon filtration. This product, dimethylsilyl bis[4-(o-tolyl)-2-methylindenyl] $Zr(O\text{-}t\text{-}Bu)_2$, was purely the rac isomer; no meso isomer was observed by $^1H$ NMR.

Comparative Example 1

In a comparative example, deprotonation of the same bis (indenyl) ligand followed by metallation with $ZrCl_4(thf)_2$ according to the same process used in Example 1 produced a Comparative Example product mixture which was roughly 1:1 rac: meso, and which required repeated crystallizations to only partially separate the meso isomer from the racemic isomer.

Example 2

A dimethylsilyl bis[4-(phenyl)-2-methylindenyl]Zr(O-t-Bu)$_2$ catalyst precursor was used to polymerize ethylene and hexene. The precursor was prepared according the general procedure in Example 1 and obtained about 3:1 race meso isomer. Thereafter the precursor was purified with using an ether wash and then crystallized from a methylene chloride/pentane solvent mixture.

A 30% by weight solution of MAO in toluene (Albemarle; 0.7951 g; 4.112 mmol) was dissolved in 1.5 mL of toluene; this solution was stirred for 15 minutes. To this solution, the catalyst precursor (29.9 mg; 0.0415 mmol) was added as a solid, and remnants were washed in with 0.5 mL of toluene. The reaction mixture was stirred for 20 minutes. To this reaction mixture was added 1.0404 g of silica-948 (Grace), which had previously been calcined at 600° C. The wet mixture was stirred with a spatula for 10 minutes and then dried under vacuum. A 2 L reactor was charged with 15 mL of hexene and 0.1 mL tri(n-octyl)aluminum. The reactor was filled with hydrogen to a pressure of 20.7 kPa (3.0 psi). Then 800 mL of isobutene were added, and the reactor was heated to 85° C. The reactor was saturated with 758 kPa (110 psi) of ethylene, and 63.1 mg of the silica-supported catalyst was subsequently injected. The reaction was run for 40 minutes under these conditions, resulting in 16.582 g of polymer.

Example 3

A 2 L reactor was charged with 1000 mL of propylene and 0.1 mL tri(n-octyl)aluminum and was heated to 70° C. Subsequently, 100.8 mg of the silica-supported catalyst from Example 2 was injected. The reaction was run for 60 minutes under these conditions, resulting in 5.054 g of polymer.

As the examples show, the process according to embodiments of the invention produces a racemic enriched catalyst precursor, suitable for the polymerization processes disclosed herein.

All documents described herein are incorporated by reference herein, including any priority documents and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A process comprising:

1) contacting a deprotonated bridged bis(indenyl) compound with a rac-directing metallation reagent to form a product mixture comprising at least 51 mol % of racemic isomer of a bridged bis(indenyl)metallocene transition metal compound based on the total amount of racemic isomer and meso isomer formed, wherein the rac-directing metallation reagent is represented by the formula:

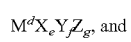

the deprotonated bridged bis(indenyl) compound is represented by the formula:

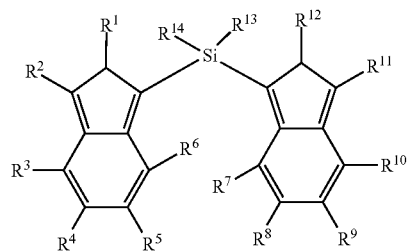

wherein each of $R^1, R^2, R^3, R^4, R^5, R^6, R^7, R^8, R^9, R^{10}, R^{11}, R^{12}, R^{13}$, and $R^{14}$ is independently, a hydrogen, a halogen, a $C_1\text{-}C_{20}$ hydrocarbyl radical, a functional group comprising elements from groups 13, 14, 15, 16, or 17 of the periodic table of the elements, or a combination thereof; and wherein the bis(indenyl)metallocene transition metal compound is represented by the formula:

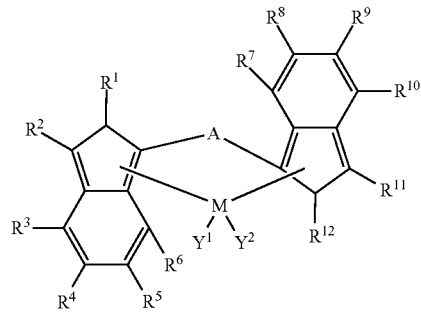

wherein d is the coordination number of the metal, M, and is 4, 5 or 6, e is 2, 3, 4 or 5, f is 1, 2, 3 or 4 and g is 0, 1 or 2;

wherein M is a Group 4, 5, or 6 metal of the periodic table of the elements;

wherein A is a divalent radical represented by the formula:

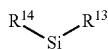

where $R^{13}$ and $R^{14}$ are as defined above;
wherein each X is a halogen, a triflate or pseudohalogen;
wherein each of Y, $Y^1$ and $Y^2$ is, independently, —$OR^a$ —$SR^a$, —$NR^a{}_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $R^1, R^2, R^3, R^4, R^5, R^6, R^7, R^8, R^9, R^{10}, R^{11}$, and $R^{12}$ is as defined above,
wherein each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof; and
where e+f=d;
2) supporting the bridged bis(indenyl)metallocene transition metal compound on a support material;
3) contacting the bridged bis(indenyl)metallocene transition metal compound with an activator to form a catalyst system, where the activator comprises alumoxane and the alumoxane is present at a ratio of 1 mole aluminum or more per mole of bridged bis(indenyl)metallocene transition metal compound; and
4) contacting one or more olefins with the catalyst system at polymerization conditions to produce a polyolefin.

2. The process of claim 1, wherein the product mixture comprises more than 90 mol % of the racemic isomer based on the total amount of the bis(indenyl)metallocene transition metal compound formed.

3. The process of claim 1, wherein the bridged bis(indenyl) metallocene transition metal compound formed consists essentially of the racemic isomer.

4. The process of claim 1, wherein:
A is dimethyl silyl; X is Cl;
each Y is —O-iPr, or —O-tBu; and
Z comprises a tetrahydrofuranyl moiety.

5. The process of claim 1, wherein the bridged bis(indenyl) compound is represented by the formula:

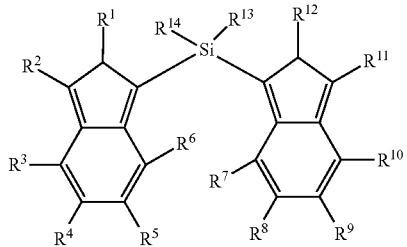

wherein each of $R^1, R^2, R^3, R^4, R^5, R^6, R^7, R^8, R^9, R^{10}, R^{11}$, $R^{12}, R^{13}$, and $R^{14}$ is independently, a hydrogen, a halogen, a $C_1$-$C_{20}$ hydrocarbyl radical.

6. The process of claim 5, wherein $R^{13}$ and $R^{14}$ are independently a $C_1$-$C_{10}$ hydrocarbyl radical.

7. The process of claim 6, wherein $R^1$ and $R^{12}$ each comprise a $C_1$-$C_{10}$ hydrocarbyl radical.

8. A process comprising:
A) contacting a deprotonated bridged bis(indenyl) compound with a rac-directing metallation reagent to form a product mixture comprising at least 51 mol % of racemic isomer of a bridged bis(indenyl)metallocene transition metal compound based on the total amount of racemic isomer and meso isomer formed, wherein the rac-directing metallation reagent is represented by the formula:

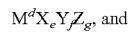

wherein the rac-bis(indenyl)metallocene catalyst precursor is represented by the formula:

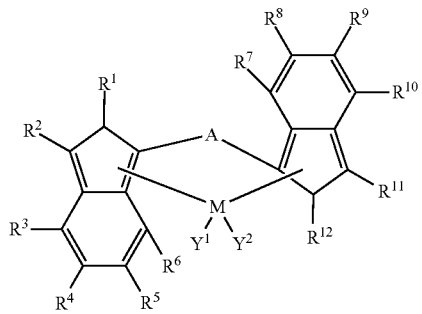

wherein d is the coordination number of the metal, M, and is 4, 5 or 6, e is 2, 3, 4 or 5, f is 1, 2, 3 or 4 and g is 0, 1 or 2, where e+f=d;
wherein M is a Group 4, 5, or 6 metal of the periodic table of the elements;
wherein A is a divalent radical comprising a $C_1$-$C_{20}$ hydrocarbyl radical, a functional group comprising elements from groups 13, 14, 15, 16, or 17 of the periodic table of the elements, or a combination thereof;
wherein each X is a halogen, a triflate or pseudohalogen;
wherein each of Y, $Y^1$ and $Y^2$ is, independently, —$OR^a$ —$SR^a$, —$NR^a{}_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $R^1, R^2, R^3, R^4, R^5, R^6, R^7, R^8, R^9, R^{10}, R^{11}$, and $R^{12}$ is, independently, hydrogen, halogen, a $C_1$-$C_{20}$ hydrocarbyl radical, a functional group comprising an element from groups 13, 14, 15, 16, or 17 of the periodic table of the elements, or a combination thereof; and
wherein each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof;
B) contacting the bridged bis(indenyl)metallocene catalyst precursor with an activator to form a catalyst system; and
C) contacting one or more olefins with the catalyst system at polymerization conditions to produce a polyolefin.

9. The process of claim 8, further comprising contacting the bridged bis(indenyl)metallocene catalyst precursor with an alumoxane prior or contacting the bridged bis(indenyl) metallocene catalyst precursor with a non-coordinating anion activator.

10. The process of claim 9, wherein the alumoxane is methylalumoxane.

11. The process of claim 8, wherein the deprotonated bridged bis(indenyl) compound is contacted with the rac-directing metallation reagent in the presence of the activator(s), the one or more olefins, or a combination thereof.

12. The process of claim 8, further comprising supporting the rac-bis(indenyl)metallocene catalyst precursor on a support material.

13. A process comprising:
A) contacting a deprotonated bridged bis(indenyl) compound with a rac-directing metallation reagent to form a product mixture comprising at least 51 mol % of racemic isomer of a bridged bis(indenyl)metallocene catalyst precursor based on the total amount of racemic isomer and meso isomer formed, wherein the rac-directing metallation reagent is represented by the formula:

$MX_2Y_2Z_2$, and wherein the rac-bis(indenyl)metallocene catalyst precursor is represented by the formula:

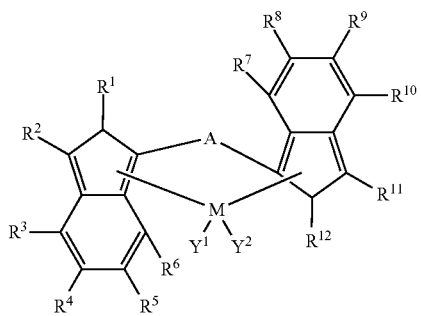

wherein M is a Hf, Zr or Ti;
wherein A is a divalent radical comprising a $C_1$-$C_{20}$ hydrocarbyl radical, a functional group comprising elements from groups 13, 14, 15, 16, or 17 of the periodic table of the elements, or a combination thereof;
wherein each X is independently a halogen, a triflate or pseudohalogen;
each Y is, independently, —$OR^a$ —$SR^a$, —$NR^a{}_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $Y^1$ and $Y^2$ is, independently, —$OR^a$ —$SR^a$, —$NR^a{}_2$ and —$P(R^a)(R^b)$, where each $R^a$ is independently a $C_3$ to $C_{20}$ hydrocarbyl having a molecular volume greater than or equal to an isopropyl substitution or a $C_3$ to $C_{20}$ hydrocarbyl substituted organometalloid having a molecular volume greater than or equal to an isopropyl substitution, and $R^b$ is hydrogen, a halogen or a $C_1$ to $C_{20}$ substituted or unsubstituted hydrocarbyl, or $R^b$ is, independently, as defined for $R^a$;
wherein each of $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, halogen, a $C_1$-$C_{20}$ hydrocarbyl radical, a functional group comprising an element from groups 13, 14, 15, 16, or 17 of the periodic table of the elements, or a combination thereof, provided that $R^1$ and $R^{12}$ are, independently, a $C_1$ to $C_{12}$ alkyl group and $R^3$ and $R^{10}$ are a substituted or unsubstituted phenyl group; and
wherein each Z is, independently, a leaving group comprising a monovalent $C_2$-$C_{20}$ hydrocarbyl radical, a monovalent functional group comprising an element from groups 13, 14, 15, 16, or 17 of the periodic table of the elements, or a combination thereof;
B) contacting the bridged bis(indenyl)metallocene catalyst precursor with an activator to form a catalyst system; and
C) contacting one or more olefins with the catalyst system at polymerization conditions to produce a polyolefin.

14. The process of claim 13 where the activator comprises alumoxane.

15. The process of claim 1, wherein the product mixture comprises more than 90 mol % of the racemic isomer based on the total amount of the bis(indenyl)metallocene transition metal compound formed, without subsequent purification to remove meso isomer present in the product mixture.

16. The process of claim 1, wherein the product mixture comprises more than 95 mol % of the racemic isomer based on the total amount of the bis(indenyl)metallocene transition metal compound formed, without subsequent purification to remove meso isomer present in the product mixture.

17. The process of claim 1, wherein the product mixture comprises more than 99 mol % of the racemic isomer based on the total amount of the bis(indenyl)metallocene transition metal compound formed, without subsequent purification to remove meso isomer present in the product mixture.

* * * * *